United States Patent
Yavuz et al.

(10) Patent No.: US 9,119,164 B2
(45) Date of Patent: Aug. 25, 2015

(54) GENERATING ACCESS POINT BEACONS AT DIFFERENT POWER LEVELS

(75) Inventors: Mehmet Yavuz, San Diego, CA (US); Sanjiv Nanda, Ramona, CA (US); Manoj M. Deshpande, San Diego, CA (US); Chirag S. Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 12/542,294

(22) Filed: Aug. 17, 2009

(65) Prior Publication Data

US 2010/0048212 A1    Feb. 25, 2010

Related U.S. Application Data

(60) Provisional application No. 61/090,548, filed on Aug. 20, 2008.

(51) Int. Cl.
| | |
|---|---|
| *H04W 4/00* | (2009.01) |
| *H04W 52/32* | (2009.01) |
| *H04W 52/24* | (2009.01) |
| H04W 52/28 | (2009.01) |
| H04W 84/04 | (2009.01) |

(52) U.S. Cl.
CPC .......... *H04W 52/325* (2013.01); *H04W 52/244* (2013.01); *H04W 52/245* (2013.01); *H04W 52/28* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 5,134,615 A | * | 7/1992 | Freeburg et al. | 370/347 |
| 5,513,210 A | * | 4/1996 | Vook et al. | 375/133 |
| 5,530,918 A | * | 6/1996 | Jasinski | 340/7.25 |
| 5,940,768 A | * | 8/1999 | Thro et al. | 455/507 |
| 6,219,528 B1 | * | 4/2001 | Wright et al. | 455/13.4 |
| 6,535,747 B1 | * | 3/2003 | Shah et al. | 455/522 |
| 6,615,035 B1 | * | 9/2003 | Lucidarme et al. | 455/411 |
| 6,717,926 B1 | * | 4/2004 | Deboille et al. | 370/330 |
| 7,092,353 B2 | | 8/2006 | Laroia et al. | |

(Continued)

FOREIGN PATENT DOCUMENTS

| | | |
|---|---|---|
| CN | 101217784 A | 7/2008 |
| EP | 1942611 A2 | 7/2008 |

(Continued)

OTHER PUBLICATIONS

International Search Report and Written Opinion—PCT/US2009/054544—ISA/EPO—Dec. 23, 2009.

(Continued)

*Primary Examiner* — Kibrom T Hailu
*Assistant Examiner* — James P Duffy

(57) ABSTRACT

An access point generates beacons at different power levels at different times to provide an acceptable tradeoff between coverage area associated with the beacons and outage experienced at nearby access terminals. For example, a femto access point may transmit beacons at a relatively low power for a relatively long period of time to reduce interference at nearby access terminals that are being served by a macro access point. The femto access point may then transmit beacons at a relatively high power for a relatively short period of time to enable nearby access terminals to receive the beacons. Also, a given transmit chain may be used to provide frequency hopping of high and low power beacons.

30 Claims, 21 Drawing Sheets

(56) References Cited

U.S. PATENT DOCUMENTS

| | | | |
|---|---|---|---|
| 7,830,847 B1* | 11/2010 | Sill et al. | 370/338 |
| 7,899,018 B2 | 3/2011 | Balasubramanian et al. | |
| 7,974,230 B1* | 7/2011 | Talley et al. | 370/318 |
| 8,280,383 B2 | 10/2012 | Brisebois et al. | |
| 8,682,331 B2 | 3/2014 | Nagaraja et al. | |
| 2003/0133431 A1* | 7/2003 | Rudolf | 370/342 |
| 2004/0166886 A1* | 8/2004 | Laroia et al. | 455/522 |
| 2004/0166887 A1 | 8/2004 | Laroia et al. | |
| 2005/0064818 A1* | 3/2005 | Assarsson et al. | 455/41.2 |
| 2005/0272431 A1* | 12/2005 | Katori et al. | 455/446 |
| 2006/0089141 A1 | 4/2006 | Ho et al. | |
| 2006/0274686 A1 | 12/2006 | Gulick | |
| 2007/0183479 A1* | 8/2007 | Noll et al. | 375/132 |
| 2007/0202913 A1 | 8/2007 | Ban | |
| 2007/0243878 A1* | 10/2007 | Taira et al. | 455/450 |
| 2008/0096553 A1 | 4/2008 | Saksena et al. | |
| 2008/0130795 A1* | 6/2008 | Chang et al. | 375/329 |
| 2009/0005105 A1* | 1/2009 | Hwang et al. | 455/522 |
| 2009/0052395 A1* | 2/2009 | Bao et al. | 370/331 |
| 2009/0111499 A1 | 4/2009 | Bosch et al. | |
| 2009/0280819 A1* | 11/2009 | Brisebois et al. | 455/446 |
| 2010/0056132 A1 | 3/2010 | Gallagher | |
| 2010/0091702 A1 | 4/2010 | Luo et al. | |
| 2012/0039265 A1 | 2/2012 | Patel et al. | |
| 2012/0046026 A1 | 2/2012 | Chande et al. | |
| 2012/0046063 A1 | 2/2012 | Chande et al. | |
| 2012/0115488 A1 | 5/2012 | Jiang et al. | |
| 2012/0142392 A1 | 6/2012 | Patel et al. | |
| 2012/0252453 A1 | 10/2012 | Nagaraja et al. | |

FOREIGN PATENT DOCUMENTS

| | | |
|---|---|---|
| EP | 2009941 | 12/2008 |
| JP | 2005510938 A | 4/2005 |
| JP | 2007235201 A | 9/2007 |
| JP | 2007259077 A | 10/2007 |
| KR | 20080064751 A | 7/2008 |
| KR | 20080064754 A | 7/2008 |
| RU | 2006128596 A | 2/2008 |
| RU | 2374772 C2 | 11/2009 |
| WO | 03047117 A2 | 6/2003 |
| WO | 2005076543 | 8/2005 |
| WO | 2005094007 A1 | 10/2005 |
| WO | 2008004299 A1 | 1/2008 |

OTHER PUBLICATIONS

Taiwan Search Report—TW098127928—TIPO—Sep. 3, 2012.
Zhang Y et al., "A New Priority-Guaranteed MAC Protocol for Emerging Body Area Networks" Wireless and Mobile Communications, 2009. ICWMC '09. Fifth International Conference on, IEEE, Piscataway, NJ, USA, Aug. 23, 2009, pp. 140-145, XP031541973, ISBN: 978-1-4244-4679-7 p. 143; table 2.
Co-pending U.S. Appl. No. 14/159,294, filed Jan. 20, 2014.

* cited by examiner

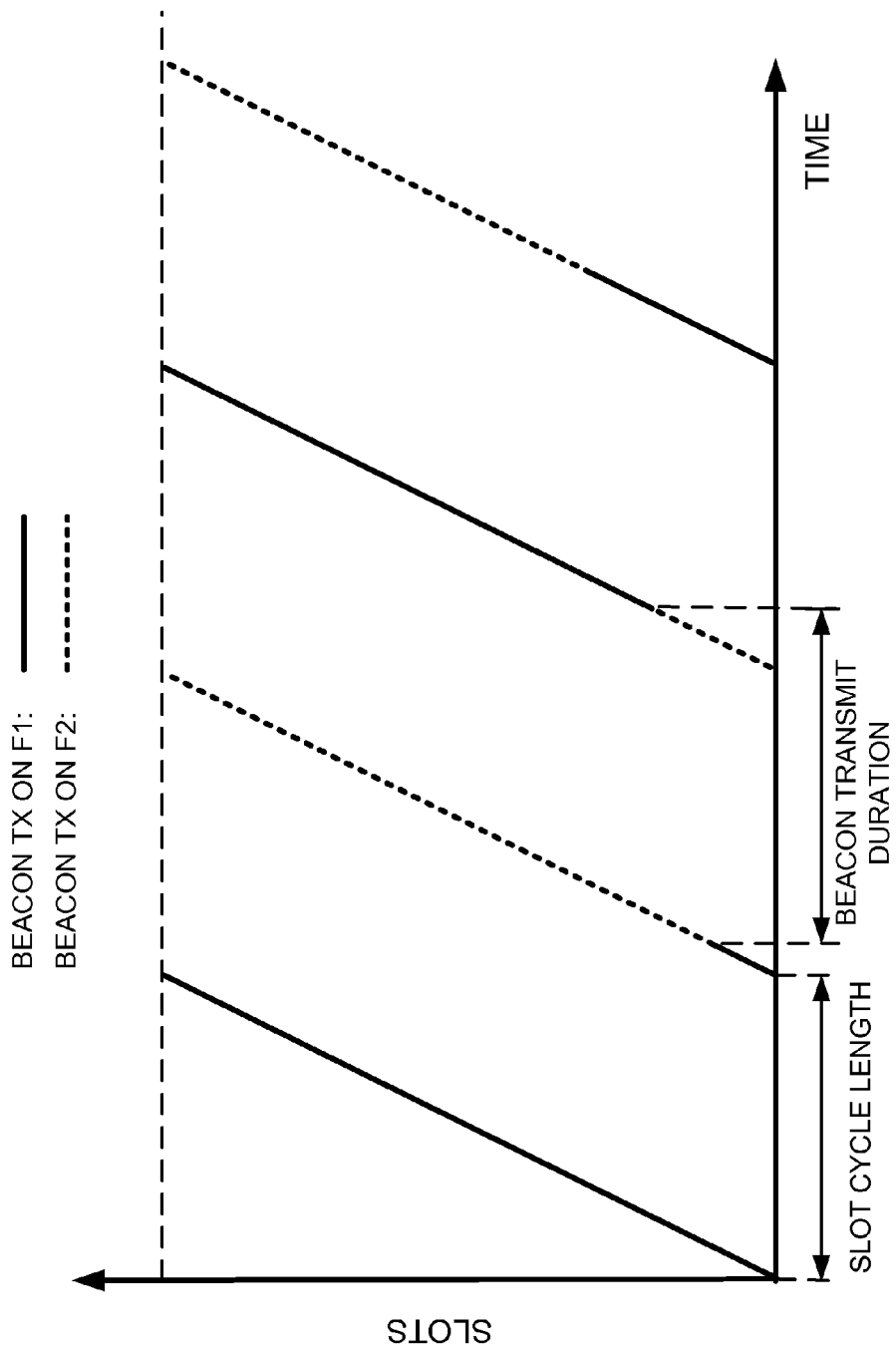

| Slot Cycle Length = 5.12 sec (Without F-QPCH) | Total Number of Carriers | | | | | | | | | | |
|---|---|---|---|---|---|---|---|---|---|---|---|
| | 2 | | | 3 | | | 4 | | | 5 | | |
| Beacon Transmit Duration [ms] | Max Delay Acquiring Femto (sec) | Service Outage Duration (sec) | Service Outage Period (sec) | Max Delay Acquiring Femto (sec) | Service Outage Duration (sec) | Service Outage Period (sec) | Max Delay Acquiring Femto (sec) | Service Outage Duration (sec) | Service Outage Period (sec) | Max Delay Acquiring Femto (sec) | Service Outage Duration (sec) | Service Outage Period (sec) |
| 200 | 15.4 | 0.20 | 0.48 | 23.0 | 0.20 | 0.72 | 30.7 | 0.20 | 0.96 | 38.4 | 0.20 | 1.20 |
| 280 | 13.7 | 0.28 | 0.64 | 20.5 | 0.28 | 0.96 | 27.3 | 0.28 | 1.28 | 34.1 | 0.28 | 1.60 |
| 360 | 12.8 | 0.36 | 0.80 | 19.2 | 0.36 | 1.20 | 25.6 | 0.36 | 1.60 | 32.0 | 0.36 | 2.00 |
| 440 | 12.3 | 0.44 | 0.96 | 18.4 | 0.44 | 1.44 | 24.6 | 0.44 | 1.92 | 30.7 | 0.44 | 2.40 |
| 520 | 11.9 | 0.52 | 1.12 | 17.9 | 0.52 | 1.68 | 23.9 | 0.52 | 2.24 | 29.9 | 0.52 | 2.80 |
| 600 | 11.7 | 0.60 | 1.28 | 17.6 | 0.60 | 1.92 | 23.4 | 0.60 | 2.56 | 29.3 | 0.60 | 3.20 |
| 6000 | 12.0 | 6.00 | 12.00 | 18.0 | 6.00 | 18.00 | 24.0 | 6.00 | 24.00 | 30.0 | 6.00 | 30.00 |

FIG. 11A

| Slot Cycle Length = 5.12 sec (With F-QPCH) | Total Number of Carriers | | | | | | | | | | | |
|---|---|---|---|---|---|---|---|---|---|---|---|---|
| | 2 | | | 3 | | | 4 | | | 5 | | |
| | Max Delay Acquiring Femto (sec) | Service Outage Duration (sec) | Service Outage Period (sec) | Max Delay Acquiring Femto (sec) | Service Outage Duration (sec) | Service Outage Period (sec) | Max Delay Acquiring Femto (sec) | Service Outage Duration (sec) | Service Outage Period (sec) | Max Delay Acquiring Femto (sec) | Service Outage Duration (sec) | Service Outage Period (sec) |
| 200 | 30.7 | 0.20 | 0.48 | 46.1 | 0.20 | 0.72 | 61.4 | 0.20 | 0.96 | 76.8 | 0.20 | 1.20 |
| 280 | 20.5 | 0.28 | 0.64 | 30.7 | 0.28 | 0.96 | 41.0 | 0.28 | 1.28 | 51.2 | 0.28 | 1.60 |
| 360 | 17.1 | 0.36 | 0.80 | 25.6 | 0.36 | 1.20 | 34.1 | 0.36 | 1.60 | 42.7 | 0.36 | 2.00 |
| 440 | 15.4 | 0.44 | 0.96 | 23.0 | 0.44 | 1.44 | 30.7 | 0.44 | 1.92 | 38.4 | 0.44 | 2.40 |
| 520 | 14.3 | 0.52 | 1.12 | 21.5 | 0.52 | 1.68 | 28.7 | 0.52 | 2.24 | 35.8 | 0.52 | 2.80 |
| 600 | 13.7 | 0.60 | 1.28 | 20.5 | 0.60 | 1.92 | 27.3 | 0.60 | 2.56 | 34.1 | 0.60 | 3.20 |
| 6000 | 12.0 | 6.00 | 12.00 | 18.0 | 6.00 | 18.00 | 24.0 | 6.00 | 24.00 | 30.0 | 6.00 | 30.00 |
| Beacon Transmit Duration [ms] | | | | | | | | | | | | |

FIG. 11B

GENERATING ACCESS POINT BEACONS AT DIFFERENT POWER LEVELS

CLAIM OF PRIORITY

This application claims the benefit of and priority to commonly owned U.S. Provisional Patent Application No. 61/090,548, filed Aug. 20, 2008, the disclosure of which is hereby incorporated by reference herein.

BACKGROUND

1. Field

This application relates generally to wireless communication and more specifically, but not exclusively, to generating communication beacons.

2. Introduction

Wireless communication systems are widely deployed to provide various types of communication to multiple users. For example, voice, data, multimedia services, etc., may be provided to users' access terminals (e.g., cell phones). As the demand for high-rate and multimedia data services rapidly grows, there lies a challenge to implement efficient and robust communication systems with enhanced performance.

To supplement conventional mobile phone network access points (e.g., macro base stations), small-coverage access points may be deployed to provide more robust indoor wireless coverage to access terminals. Such small-coverage access points are generally known as access point base stations, Home NodeBs, Home eNodeBs, femto access points, or femto cells. Typically, such small-coverage access points (e.g., installed in a user's home) are connected to the Internet and the mobile operator's network via a DSL router or a cable modem.

When an access terminal that is in idle mode (e.g., camping on a macro access point) approaches a small-coverage access point, it may be desirable to handover the access terminal to the small-coverage access point so that the access terminal may access the services provided there. To this end, the small-coverage access point may transmit beacons so that an access terminal may determine when it is in the vicinity of the small-coverage access point. In practice, however, these beacons signals may interfere with reception at other nearby access terminals that are not allowed to be handed-over to the small coverage access point. For example, when such an access terminal is in an active voice call with a macro access point, the access terminal may be affected by interference from the small coverage access point if the access terminal passes by the building where the small coverage access point is deployed. While reducing the transmit power for the beacons may reduce this interference, such a reduction in transmit power also will reduce the coverage area associated with the beacon. This, in turn, may prevent access terminals from discovering the presence of the small-coverage access point.

SUMMARY

A summary of sample aspects of the disclosure follows. It should be understood that any reference to the term aspects herein may refer to one or more aspects of the disclosure.

The disclosure relates in some aspects to generating beacons at an access point. For example, a femto access point may generate beacons in a manner that provides an acceptable tradeoff between coverage area associated with the beacons and outage experienced at nearby access terminals served by a macro access point.

The disclosure relates in some aspects to a layered beacon scheme whereby beacons are transmitted at different power levels at different times. For example, a femto access point may transmit beacons at a relatively low power for a relatively long period of time to reduce interference at nearby access terminals that are being served by a macro access point. The femto access point may then transmit beacons at a relatively high power for a relatively short period of time to enable nearby access terminals to receive the beacons. In this way, a larger coverage area is temporarily provided so that access terminals that may wish to be handed-over to the femto access point are provided with a better opportunity to discover the femto access point. Here, since the period of high power may be relatively short, an acceptable tradeoff may be made between reachability of the femto access point and interference with nearby access terminals. Thus, the disclosed scheme may provide a more effective mechanism for generating beacons as compared to, for example, conventional schemes that used a fixed power for transmitting beacons thereby creating fixed levels of interference (e.g., which may be unacceptably high) and fixed levels of coverage (e.g., which may prevent stationary or other access points from discovering the femto access point).

In some aspects, this scheme may be advantageously employed in conjunction with frequency hopping. For example, a given transmit chain may be used to transmit both high and low power beacons on different carriers.

BRIEF DESCRIPTION OF THE DRAWINGS

These and other sample aspects of the disclosure will be described in the detailed description and the appended claims that follow, and in the accompanying drawings, wherein:

FIG. 9A is a simplified diagram of a sample beacon transmit duration;

FIG. 11A is a simplified table illustrating sample detection delays and service outages for different combinations of beacon transmit duration and quantity of carriers;

FIG. 11B is a simplified table illustrating sample detection delays and service outages for different combinations of beacon transmit duration and quantity of carriers where quick paging is employed;

Figure 1:
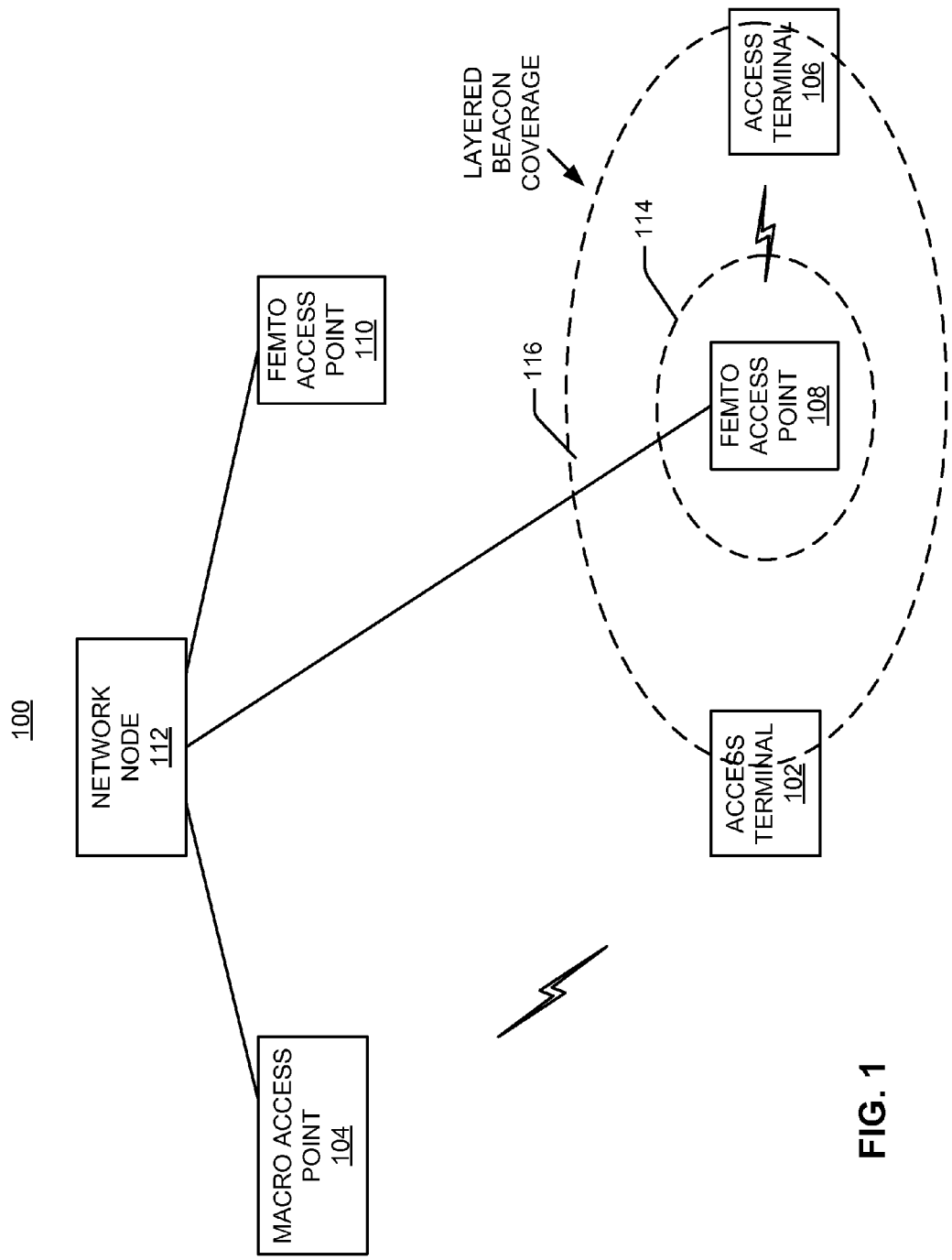
FIG. 1 is a simplified block diagram of several sample aspects of a communication system comprising an access point configured to provide layered beacons.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, and so on, while access terminals may be referred to or implemented as user equipment, mobile stations, and so on.

Access points in the system 100 provide one or more services (e.g., network connectivity) for one or more wireless access terminals that may be installed within or that may roam throughout the coverage area of the system 100. For example, at various points in time an access terminal 102 may connect to an access point 104 (e.g., a macro access point), while an access terminal 106 may connect to the access point 104 or an access point 108 or 110 (e.g., femto access points). Each of the access points 104, 108, and 110 may communicate with one or more network nodes (represented, for convenience, by network node 112) to facilitate wide area network connectivity. Such network nodes may take various forms such as, for example, one or more radio and/or core network entities. Thus, in various implementations the network node 112 may comprise a configuration manager, a mobility management entity, or some other suitable network entity.

In accordance with the teachings herein, one or more access points in the system 100 may implement a layered beacon coverage scheme whereby communication beacon signals are transmitted at different power levels at different times (e.g., based on a defined duty cycle). Dashed lines 114 and 116 illustrate, in a simplified manner, sample layers of coverage in such a scheme. Here, a smaller area of coverage represented by the dashed line 114 corresponds to the periods of time when a lower transmit power is used while a larger area of coverage represented by the dashed line 116 corresponds to the periods of time when a higher transmit power is used. By defining the transmit powers and associated time periods appropriately, this layered beacon coverage scheme may be employed to reduce the strength and duration of interference caused by the communication beacon signals at some nearby access terminals, without imparting an unacceptable amount of delay when other access terminals attempt to acquire the communication beacon signals. Here, by keeping the delay within acceptable limits, these other access terminals may still achieve relatively fast handover to the access point that transmits these signals.

Communication beacon signals may take various forms in different implementations. In a typical implementation, communication beacon signals comprise at least one common overhead channel (e.g., as opposed to dedicated channels). For example, a common overhead channel may consist of pilot channel, paging channel, broadcast channel, synchronization channel, or any combination of these channels. As a specific example, in a CDMA2000 system (e.g., for 1xRTT), these channels may comprise a forward-link pilot channel (F-PICH), a forward-link paging channel (F-PCH), a forward-link broadcast channel (F-BCCH), a forward-link synchronization channel (F-SYNC), or any combination of these channels. For convenience, communication beacons signals may simply be referred to as beacons in the discussion that follows.

When an access terminal in idle mode gets close to the access point 108, the access terminal may receive high and/or low power beacons, depending on the relative proximity of the access terminal to the access point 108. For example, when an access terminal is very close to the access point 108, the access terminal may be able to detect the beacons that are transmitted at low power as well as at high power. Hence, the access terminal may acquire the beacon relatively quickly in this case. On the other hand, an access terminal (e.g., access terminal 106) that is at the edge of the coverage of the access point 108 may not be able to detect the low power beacon, but may be able to detect the high power beacon. Hence, this access terminal may still acquire the beacon, but with larger delay.

Sample operations of the system 100 will now be described in more detail in conjunction with the flowchart of FIG. 2 and the diagram of FIG. 3. For convenience, the operations of FIG. 2 (or any other operations discussed or taught herein) may be described as being performed by specific components (e.g., components of the system 100 or FIG. 4). It should be appreciated, however, that these operations may be performed by other types of components and may be performed using a different number of components. It also should be appreciated that one or more of the operations described herein may not be employed in a given implementation.

Figure 2:
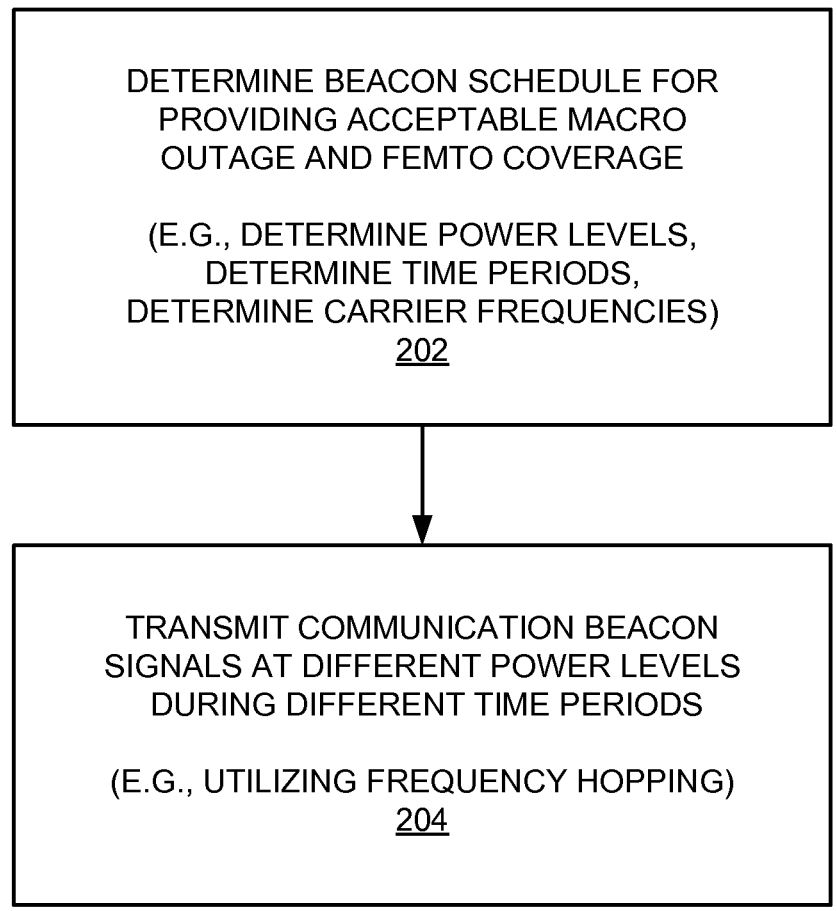
FIG. 2 is a flowchart of several sample aspects of operations that may be performed to provide layered beacons.

As represented by block 202 of FIG. 2, the access point 108 determines a beacon schedule in a manner that provides an acceptable tradeoff between coverage area associated with beacons transmitted by the access point 108 and outage experienced at nearby access terminals (e.g., access terminal 102) served by a macro access point (e.g., access point 104). To this end, the access point 108 may determine the power levels to be used to transmit beacons, time periods during which the different power levels are to be used, and the carriers (i.e., carrier frequencies) on which the beacons will be transmitted. For example, the access point 108 may determine the set of power levels (e.g., a low level and a high level) to be used for providing layered coverage. In addition, the access point 108 may determine a set of time periods (e.g., duty cycle information) associated with the different power levels. Also, the access point 108 may determine the set of designated carriers on which the beacons are to be transmitted.

In various implementations these parameters may be defined by the access point 108 or provided to the access point 108. As an example of the former case, one or more of these parameters may be defined based on signals (e.g., signal strength of neighboring access points on different frequencies) detected at the access point 108. As an example of the latter case, one or more of these parameters may be defined by a network plan (e.g., provided to the access point 108 by a network operator) and downloaded into a data memory of the access point 108. Accordingly, in various implementations the determinations of block 202 may involve defining (e.g., calculating) a parameter value, reading a parameter value from a data memory, or performing some other suitable operation. Examples of these operations are described in more detail below.

As represented by block 204 of FIG. 2, the access point 108 transmits beacons based on the schedule determined at block 202. For example, the access point 108 may transmit beacons at the power levels and times and over the carriers specified by the schedule.

Figure 3:
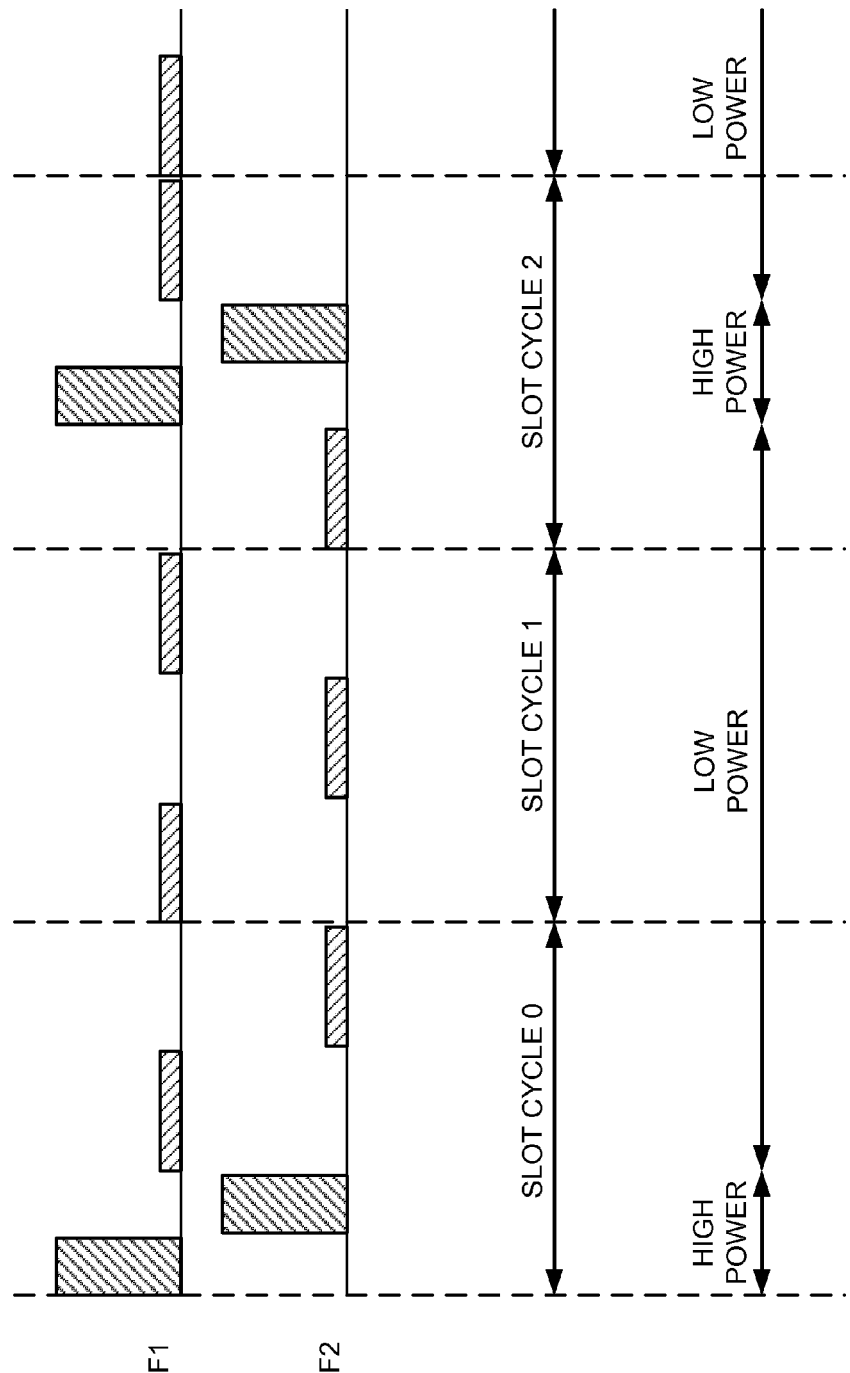
FIG. 3 is a simplified diagram of a sample beacon transmissions based on a layered coverage beacon schedule.

FIG. 3 illustrates a simplified example of beacon transmissions based on a layered coverage schedule. As indicated by the shaded boxes at the top of the figure and the arrowed lines at the bottom of the figure, beacons are transmitted at a high power level for a period of time, then transmitted at a lower power level for a period of time, then transmitted at the higher power level, and so on.

In this example, beacons are frequency hopped between different carriers. For example, when multiple channels (e.g., corresponding to different carrier frequencies) are available for an operator, a femto access point and an access terminal (e.g., previously served by a macro access point) approaching the femto access point may be operating on different carriers. For example, in 1xRTT access terminals may hash to different carriers pseudorandomly. Thus, to enable reliable detection of the femto access point by an access terminal in the femto coverage area, the femto access point transmits beacons on these different carriers. However, since the femto access point may have a limited number of transmit chains, the femto access point may only be able to transmit beacons on a limited number of carriers at a time. Thus, frequency hopping may be employed to transmit beacons at a defined duty cycle on the different carriers.

As an example of the above, the access point 108 may provide service on a carrier F3 (e.g., a so-called femto channel, not shown in FIG. 3). However, macro access points in the vicinity may be operating on two macro channels corresponding to the carriers F1 and F2. Thus, to enable access terminals that are currently being served by one of these macro access points to detect the presence of the access point 108, the access point 108 frequency hops beacons on the two carriers F1 and F2.

In the above example, the access point 108 may have two radio frequency (RF) transmit chains (e.g., comprising two RF transmitters) whereby the access point 108 may concurrently transmit two RF signals. One of the transmit chains is therefore used for the femto channel, while the other transmit chain is time shared to transmit beacons over the two macro channels. As shown by the shaded boxes of FIG. 3, during the first high power time period, a high power beacon burst is sent over carrier F1, then a high power beacon burst is sent over carrier F2. Next, during the first low power time period, lower power beacon transmissions are sent on carriers F1 and F2 in an alternate fashion. During the subsequent high power time period, high power beacon burst are again sent on carriers F1 and F2, and so on. It should be appreciated that a different number of macro channels and/or a different number of transmit chains may be used in different implementations.

FIG. 3 also illustrates an example where beacons are transmitted during so-called slot cycles. For example, a series of slot cycles (e.g., of 5.12 second duration), each of which comprises a series of time slots (e.g., of 80 millisecond duration) may be defined whereby different access terminals operating in idle mode are configured to wake-up during different designated slots of each cycle to determine whether there are any transmissions of interest to that access terminal. In this way, the access terminal may conserve power by remaining in an idle mode (e.g., a low-power sleep mode) most of the time, while only waking up (e.g., to a higher power active mode) in the event the access terminal detects a transmission of interest (e.g., a page) during its designated slot.

In such a scheme, over a period of time, the access point 108 will transmit a beacon during each slot to ensure that any access terminal in the vicinity (which may be assigned any one of the slots) is able to receive at least one beacon. For example, as shown in FIG. 3, the low power beacons may be transmitted in every portion of the slot cycle at least once during slot cycles 1-3. Thus, an access terminal that is very close to the access point 108 should have received at least one beacon during the time period of slot cycles 1-3 regardless of the particular slot that is assigned to that access terminal.

Conversely, it may be seen that the high power beacons have not occurred in every slot during slot cycles 1-3 due to the lower duty cycle defined for these beacons. However, as shown in FIG. 3, the high power beacons may cover different slots during each successive transmission. In other words, for each successive high power burst, the timing of the burst changes with respect to the start of the slot cycle. Thus, over a longer time period, the high power beacons also will be transmitted in every portion of the slot cycle at least once. Consequently, an access terminal that is further away from the access point 108 (e.g., access terminal 106 that does not receive the low power beacons) may receive at least one beacon during this longer time period.

Once an access terminal receives a beacon from the access point 108 on a given carrier, the access terminal may monitor that carrier for other messages from the access point 108. For example, the access terminal may receive a message that provides information indicating how the access terminal may be redirected to the femto channel. Examples of such a message include a CDMA channel list message (CCLM), a global service redirection message (GSRDM), and a service redirection message (SRDM).

The above layered coverage scheme may provide effective beacon coverage while reducing interference at other nodes. For example, during the low power time period, access terminals that are not relatively close to the access point 108 may not receive these beacons. That is, the corresponding received signal strength for these beacons may be relatively insignificant at these access terminals. Consequently, it may be seen that for the majority of the time, these beacon transmissions may not significantly interfere with reception at any access terminals (e.g., access terminal 102) that are communicating with a macro access point. Conversely, although the high power beacon transmissions may interfere with reception at these access terminals, the duration of this interference will be relatively short. These and other aspects of the disclosure will be treated in more detail in the discussion of FIGS. 4-14 that follow.

Figure 4:
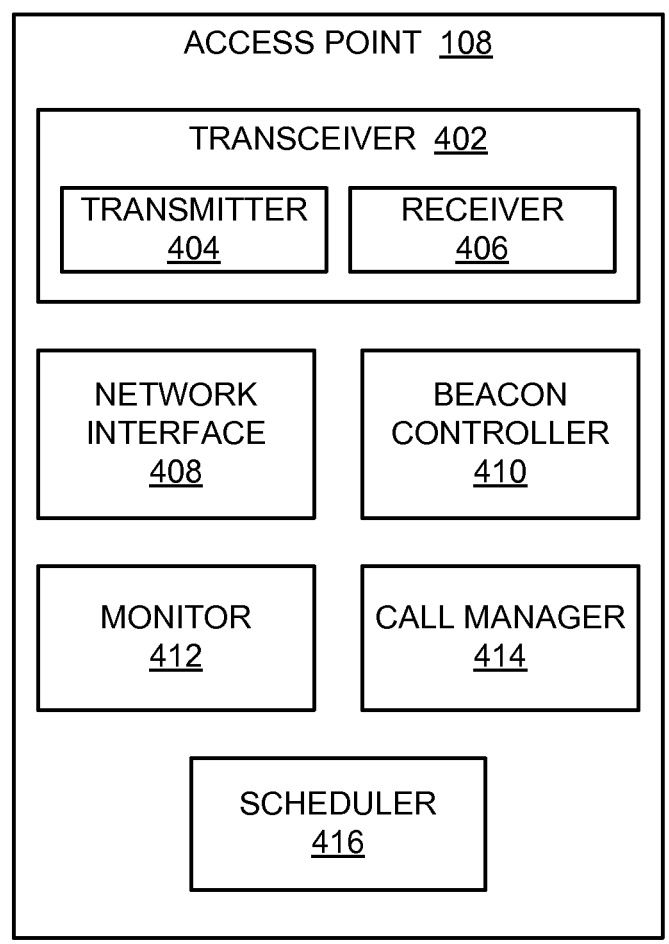
FIG. 4 is a simplified block diagram of several sample aspects of components that may be employed in a communication node.

FIG. 4 illustrates several sample components that may be incorporated into nodes such as the access point 108 to perform beacon generation operations as taught herein. The described components may be incorporated into other nodes (e.g., access points) in a communication system. Also, a given node may contain one or more of the described components. For example, an access point may contain multiple transceiver components that enable the access point to operate on multiple frequencies and/or communicate via different technologies.

As shown in FIG. 4, the access point 108 may include a transceiver 402 for communicating with wireless nodes. The transceiver 402 includes a transmitter 404 for sending signals (e.g., beacons as described above at block 204 and downlink messages) and a receiver 406 for receiving signals (e.g., uplink messages from access terminals and signals from other access points). Similarly, the access point 108 may include a network interface 408 for communicating with other network nodes. For example, the network interface 408 may be configured to communicate (e.g., wired or wireless backhaul communication) with a gateway or other suitable entity of a network to facilitate communication with one or more core network nodes (e.g., as represented by node 112 of FIG. 1).

The access point 108 also includes other components that may be used in conjunction with beacon generation operations as taught herein. For example, the access point 108 may include a beacon controller 410 for determining beacon parameters (e.g., power levels, time periods, carriers) and for providing other related functionality as taught herein. Accordingly, the beacon controller 410 may provide the functionality described above in conjunction with block 202. In addition, the access point 108 may include a monitor 412 for monitoring signals (e.g., interference or other transmissions from other access points) in cooperation with the receiver 406 and for providing other related functionality as taught herein. The access point 108 also may include a call manager 414 for managing calls to and from access terminals and for providing other related functionality as taught herein. Furthermore, the access point 108 may include a scheduler 416 that schedules the transmission of beacons (e.g., in some cases beacon transmissions are synchronized to known wake-up times of a set of access terminals as discussed herein, or in some cases beacon transmissions are scheduled using parameters determined by the beacon controller 410) and for providing other related functionality as taught herein.

For convenience the access point 108 is shown in FIG. 4 as including components that may be used in the various examples described herein. In practice, one or more of the illustrated components may not be used in a given implementation. As an example, in some implementations the access point 108 may not include the monitor 412.

Figure 5:
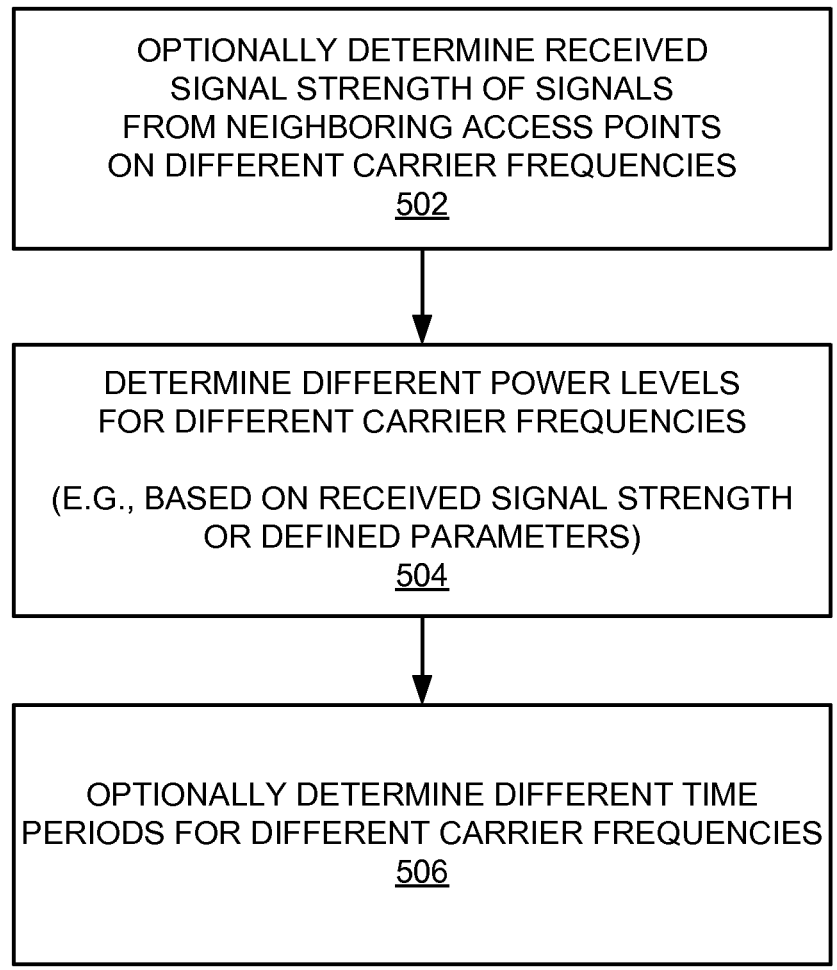
FIG. 5 is a flowchart of several sample aspects of operations that may be performed to determine power levels and time periods for different carriers.

Referring now to FIG. 5, in some implementations different beacon transmit power levels and/or different time periods may be assigned to different carriers. For example, while operating in the low and high power beacon mode described herein, different power offsets may be applied on different carriers.

As represented by block 502 of FIG. 5, in some implementations the parameters to be used for a given carrier may be based on signals sensed on that and, optionally other, carriers. For example, the access point 108 may be equipped with carrier sensing capabilities (e.g., monitor 412) that may determine the received signal level of signals from neighboring access points on different carriers. Based on this determined signal strength, the access point 108 may determine different power levels on different beacons frequencies.

As represented by block 504, the access point 108 (e.g., the beacon controller 410) determines the power levels to be used for each of the carriers. As a simplified example, a first carrier F1 may be assigned a high power level of 0 dB and a low power level of −20 dB. In addition, a second carrier F2 may be assigned a high power level of −2 dB and a low power level of −22 dB, and so on. It should be appreciated that additional power levels (i.e., more than 2) may be assigned to a given carrier in other implementations.

As mentioned above, the determination of a beacon parameter may be based on detected signals. For example, the access point 108 may define the power levels (e.g., power offsets) to be used on a particular carrier based on the received signal strength of signals from neighboring access points on this carrier. As a specific example, for a case where two carriers F1 and F2 are used, if the access point 108 detects high signal strength on carrier F1 as compared to carrier F2, the access point 108 may transmit higher power beacons on carrier F1 compared to carrier F2 to improve the effectiveness of the beacon on carrier F1.

In other cases, the determination of block 504 may be based on defined parameters. For example, the power levels to be used for the carriers may be specified by a network plan (e.g., as defined by a network operator) and downloaded into a data memory. In such a case, the determination of block 504 may simply involve, for example, reading the power level values from a data memory of the access point 108 or some other entity.

As represented by block 506, the access point 108 (e.g., the beacon controller 410) also may determine different time periods to be used for each of the carriers. For example, the access point 108 or some other entity may determine that a longer duty cycle may or should be used on one carrier for the high power bursts as compared to at least one other carrier. As a specific example, if the access point 108 detects high received signal strength from neighboring access points on carrier F1 as compared to carrier F2, the access point 108 may employ a longer duty cycle (e.g., 15% high power, 85% low power) for transmitting higher power beacons on carrier F1 as compared to the duty cycle (e.g., 10% high power, 90% low power) for transmitting higher power beacons on carrier F2 to improve the effectiveness of the beacon on carrier F1. Also, in some implementations, the determination of block 506 may be based on defined parameters (e.g., a defined network plan as discussed above).

Figure 6:
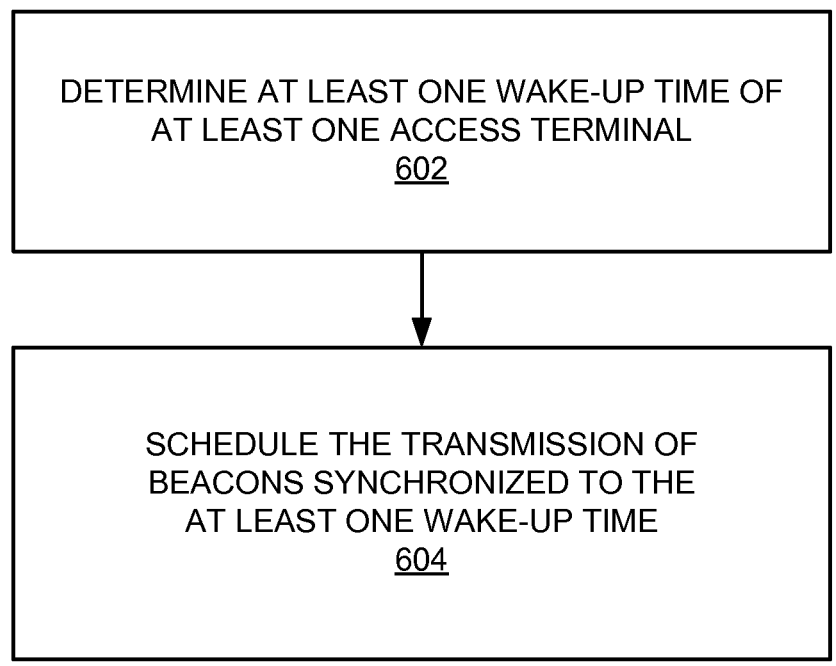
FIG. 6 is a flowchart of several sample aspects of operations that may be performed when scheduling the transmission of beacons.
Figure 7:
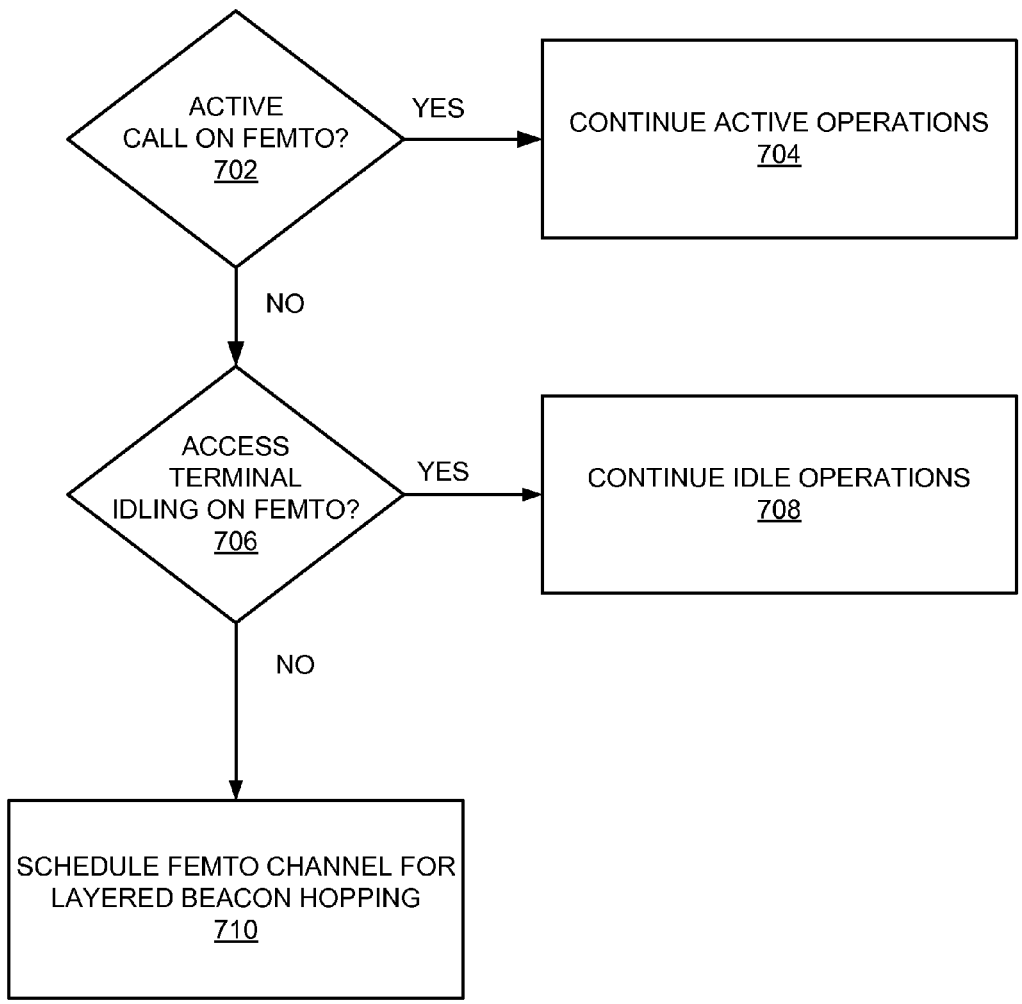
FIG. 7 is a flowchart of several sample aspects of operations that may be performed in cases where there are no active calls on a femto channel.
Figure 8:
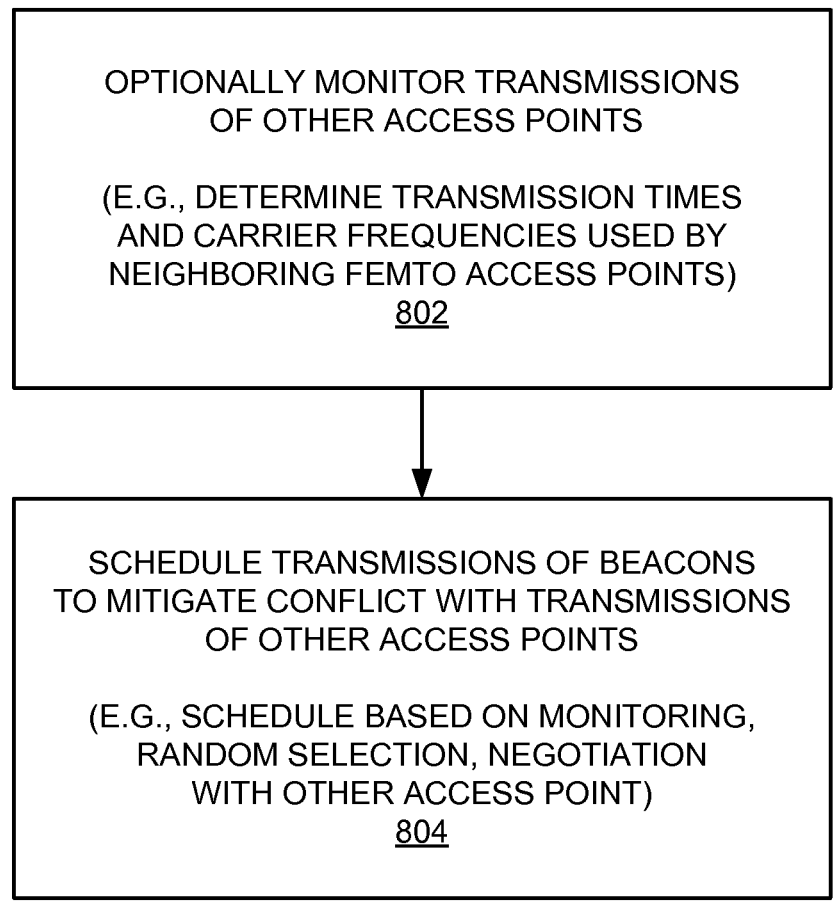
FIG. 8 is a flowchart of several sample aspects of operations that may be performed to mitigate interference with transmissions of other access points.

Referring now to FIGS. 6-8, various techniques may be employed in conjunction with the teachings herein to enable an access point to mitigate (e.g., reduce) interference with nearby nodes. For example, FIG. 6 describes a scheme whereby a femto access point may schedule the transmission of beacons to be synchronized with the wake-up time of one or more access terminals. FIG. 7 describes a scheme whereby a femto access point may cease continuous common overhead channel transmissions on the femto channel and instead transmit the channel in an intermittent (e.g., periodic) manner. For example, the transmissions may instead employ the layered hopping scheme described herein. FIG. 8 describes a scheme whereby a femto access point may schedule its beacon transmission to mitigate interference with beacons of nearby access points.

Referring initially to FIG. 6, as represented by block 602, the access point 108 determines at least one wake-up time of at least one access terminal. For example, the access point 108 may identify a set (e.g., a predetermined set) of access terminals and obtain information about their wake-up times (e.g., from the access terminals or some other entity).

As represented by block 604, the access point 108 (e.g., the scheduler 416) schedules the transmission of beacons synchronized to at least one wake-up time. In other words, the access point 108 may turn on beacons only during the determined wake-up time(s) (e.g., during one or more predetermined wake-up times).

Referring to FIG. 7, as represented by block 702, the access point 108 (e.g., the call manager 414) determines whether there is an active call on a femto channel. If so, the access point 108 may continue with its normal call processing operations on the femto channel as represented by block 704. For example, all common control channels may be turned-on on the femto channel.

As represented by block 706, if there are no active calls at block 702, the access point 108 may then determine whether there are any access terminals idling on the access point 108. If there is at least one idling access terminal, the access point 108 may continue with its normal idle operations as represented by block 708.

As represented by block 710, if there are no idling access terminals at block 706, the access point 108 may employ layered beacon coverage and hopping on the femto channel. For example, high power and low power beacons may be transmitted as discussed herein on the femto channel. In addition, frequency hopping may be employed whereby beacons are not continuously transmitted on the femto channel, but are instead transmitted on the femto channel and at least one other channel during different time periods (e.g., based on defined duty cycles) in a similar manner as discussed herein.

It should be appreciated that the operations of FIG. 6 may be used in conjunction with the operations of FIG. 7. For example, if there are no active access terminals for the access point 108, the access point 108 may schedule the transmission of beacons on the femto channel in synchronization with the wake-up time(s) of at least one access terminal idling on the femto channel.

Referring now to FIG. 8, to reduce interference from beacons of neighboring access points (e.g., femto access points), which is likely to be an issue as the number of deployed femto access points increases, neighboring femto access points may stagger their beacon transmissions in different slots.

As represented by block 802, in some implementations the access point 108 (e.g., the monitor 412) may monitor for transmissions of other access points to determine whether interference may occur. For example, the access point 108 may sniff neighboring beacons to determine which carriers are being used by neighboring femto access points and to determine the transmission times (e.g., transmission offsets) of those access points.

As represented by block 804, the access point 108 (e.g., the scheduler 416) may schedule the transmission of its beacons to mitigate conflict (e.g., interference) with transmissions by the other access points. For example, as mentioned above, the access point 108 may attempt to stagger its beacon transmissions so that these transmissions do not or are unlikely to occur at the same time and on the same frequency as the beacon transmissions of neighboring femto access points.

In some implementations the access points may employ a random staggering scheme. Here, an access point may randomly choose a slot within a slot cycle to begin its beacon transmission on a certain frequency and thereafter follow a schedule as described herein. In other words, each of the access points may randomly select the time at which it transmits beacons on the different frequencies. In this way, the probability of collisions of beacons from neighboring access points may be reduced (e.g., minimized).

In some implementations the access points may employ an intelligent sensing-based staggering scheme. In this case, the access point 108 may offset its transmissions from its neighbors by, for example, sniffing neighboring beacons as discussed above at block 802 and selecting a slot with the least amount of interference.

Other staggering schemes may be employed in other implementations. For example, in some implementations the access points may negotiate with one another (e.g., via the backhaul) so that the access points select different slots and/or frequencies for beacon transmissions.

With the above in mind, sample design considerations and design techniques that may be employed in conjunction with providing layered coverage beacons will now be described with reference to FIGS. 9A-14.

In some wireless communication systems (e.g., 1xRTT), the paging channel is divided into slots (hereafter referred to as F-PCH slots). During idle state, access terminals typically operate in slotted mode where they monitor F-PCH periodically. When monitoring the assigned F-PCH slot (wake-up state), an access terminal's circuitry may be fully enabled. After monitoring the F-PCH, the access terminal may turn off most of its circuitry to save battery life (transition to "asleep" state). Sometime before the next wake-up state, the access terminal turns on the circuitry to prepare for the next F-PCH slot (warm-up period). Thus, for proper operation of an access terminal, a beacon should be transmitted during the paging slots, allowing for a warm-up period. In slotted mode, each access point is assigned an F-PCH slot (e.g., 80 ms) with a period of a slot cycle (e.g., that may take values such as 1.28 s, 2.56 s, 5.12 s, etc). For example, for a slot cycle of 5.12 seconds there may be 64 paging slots. Assuming there are two frequencies (F1 and F2) available to the access terminal, a femto access point (hereafter referred to as a femto) may transmit beacons on F1 and F2 alternately. To provide a warm-up period, each pilot beacon may be transmitted a little longer than the required slot cycle duration (e.g., 6 s on each frequency). The time duration for which a beacon is continuously transmitted on each carrier frequency may be denoted as beacon transmit duration (BTD). FIG. 9A illustrates sample beacon operation in a system with two frequencies (F1 and F2) and a BTD greater than the slot cycle length. Since there are two frequencies in this case, when an access terminal enters into the coverage of the femto, the access terminal may be expected to detect the beacon within the time interval [0, 2*BTD] seconds.

Figure 9B:
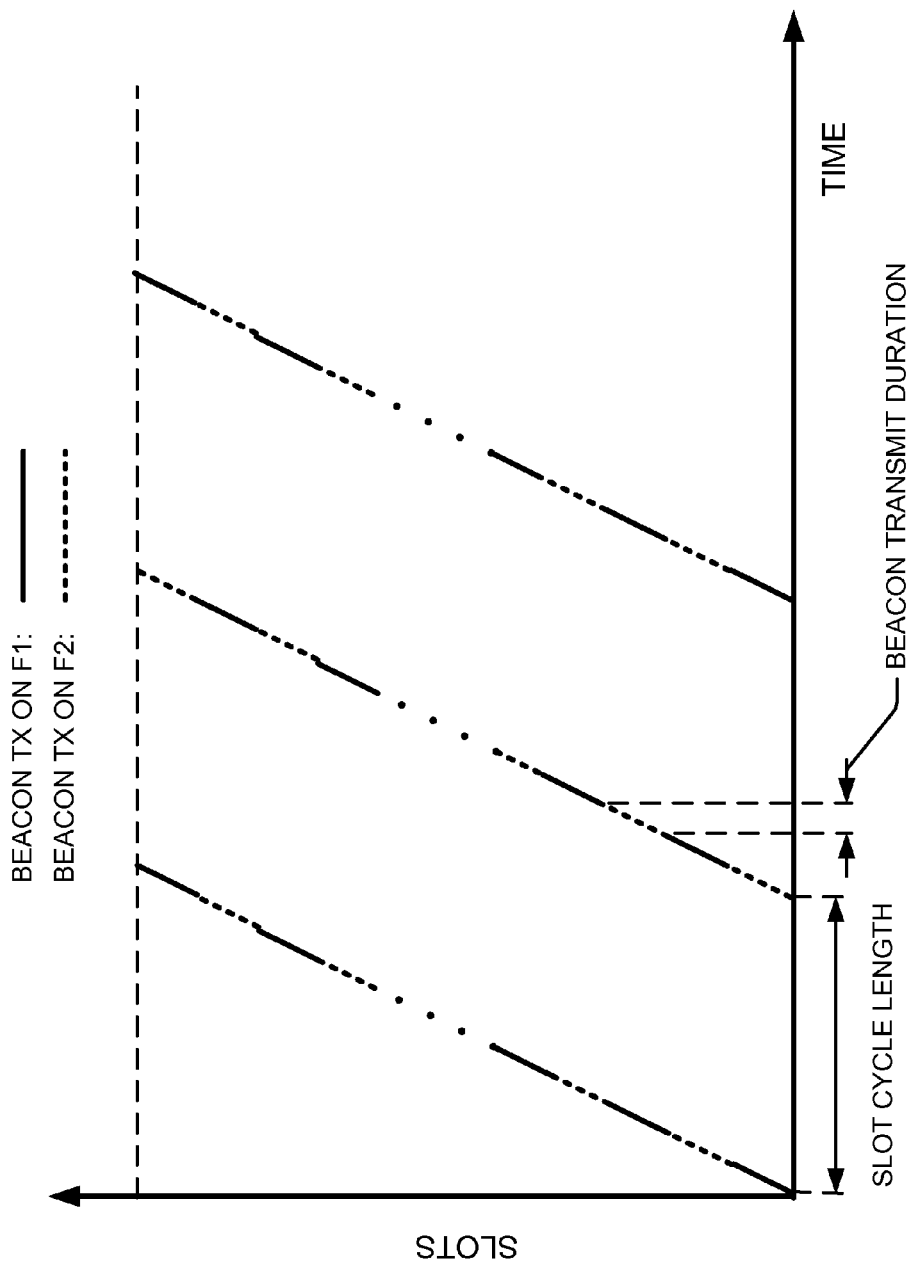
FIG. 9B is a simplified diagram of another sample beacon transmit duration.

Although beacons provide an effective mechanism for access terminals to switch to a femto cell, the beacons also may create interference for access terminals that are in the vicinity of the femto cell but are not allowed to perform handoff to the femto cell. For example, consider a scenario where an access terminal that is in an active voice call with a macro cell is passing by a house with a femto. If the femto transmits a beacon at a very high power level, the beacon may create large interference for the access terminal and may even result in a dropped call. For example, in a 1xRTT access terminal, if there are 12 consecutive erased forward link (FL) frames (e.g., 240 ms), the access terminal may disable its transmitter and start a 5 second timer. If two consecutive non-erased frames are not received before the timer expires, the access terminal may drop the call. Thus, it may be desirable to reduce the duration of beacon transmission (BTD). An example of a reduced BTD is shown in FIG. 9B.

As one sample extreme choice for a BTD parameter, BTD may be as small as one F-PCH slot (e.g., 80 ms). However, due to warm-up period requirements of access terminals, beacons may need to be transmitted for a longer period (e.g., at least 100 ms) on each carrier. There also may be a warm-up period associated with pilot beacon transmission. The above warm-up overhead suggests that it may be desirable to provide a longer BTD for efficiency.

Figure 10:
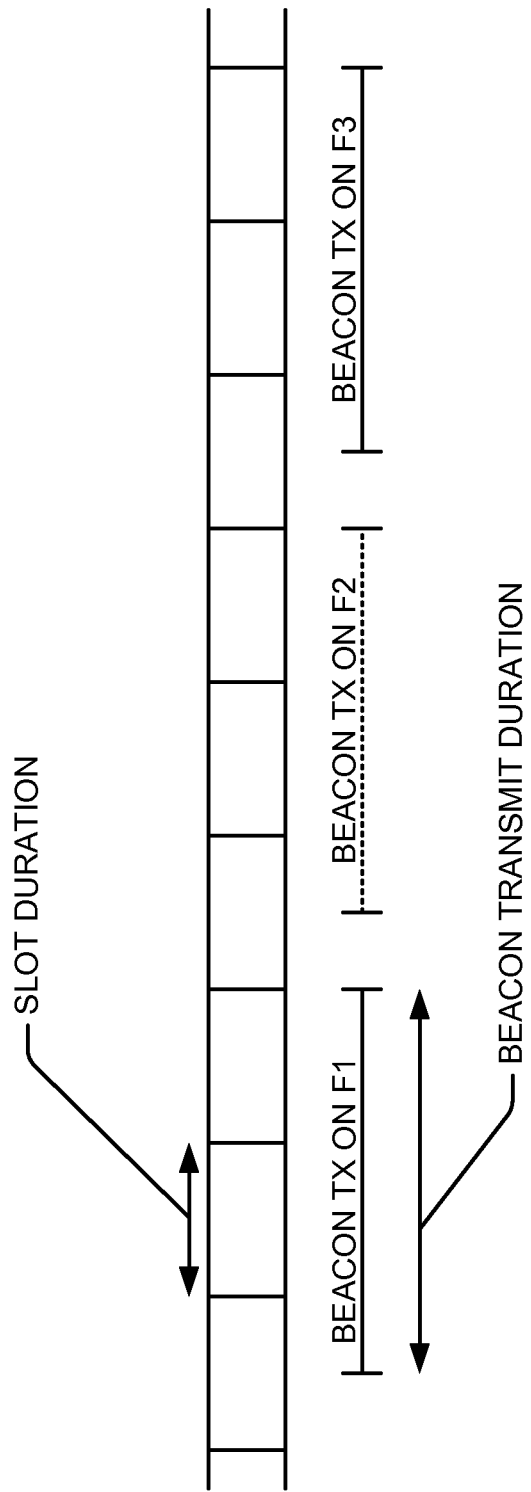
FIG. 10 is a simplified diagram of sample beacon frequency hopping.
Figure 12:
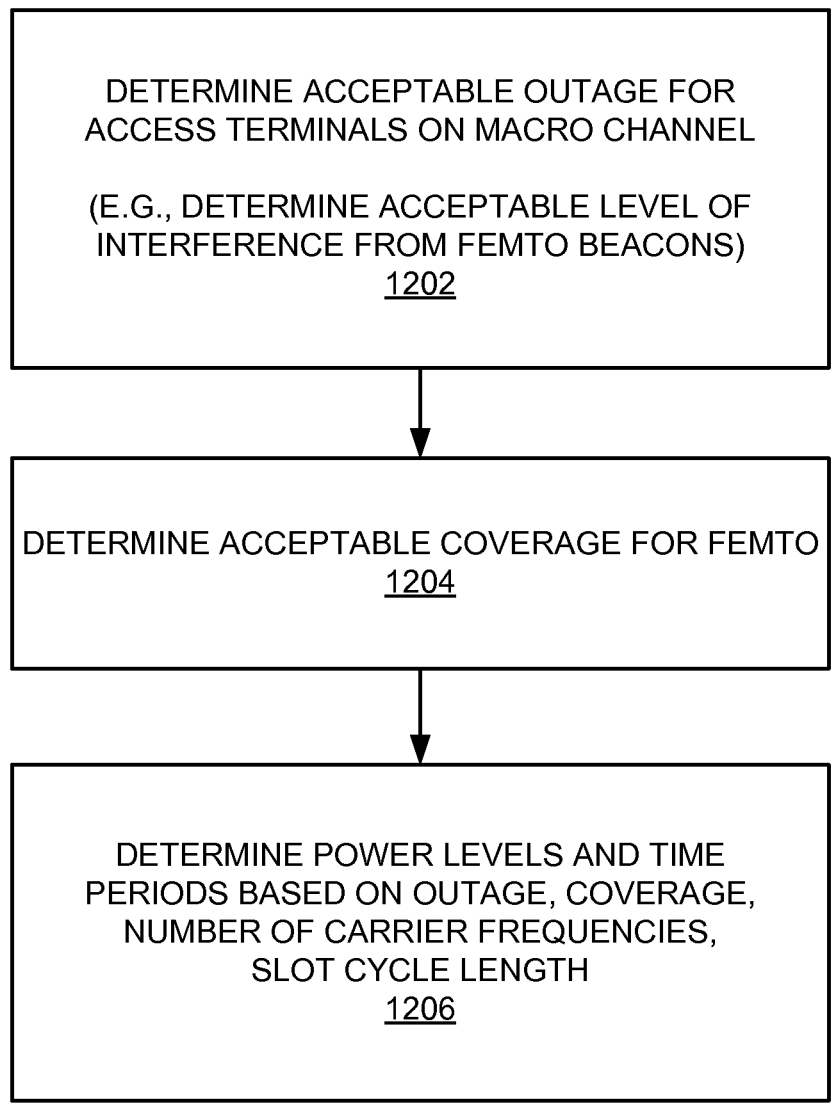
FIG. 12 is a flowchart of several sample aspects of operations that may be performed to determine power levels and time periods for beacon transmission.

As a compromise, BTD may be chosen as 200 ms. This limits the maximum outage duration to less than the 240 ms discussed above so that access terminals do not shut down reverse link (RL) transmission. Also, with BTD=200 ms, two F-PCH slots may be covered (e.g., 160 ms) while allowing for a 40 ms warm-up duration for the access terminals. Also, up to another 40 ms may be allowed for beacons to switch from one frequency to another before the start of the next F-PCH slot. This example design is shown in FIG. 10. In this case, it is noted that only 2 out of 6 consecutive F-PCH slots are guaranteed to be covered with a beacon on each frequency. Thus, when an access terminal enters into femto cell coverage, the access terminal may be expected to detect the beacon within the time interval [0, 3*(Slot Cycle Length)] seconds.

To further improve the battery life of access terminals, some systems may utilize a quick paging channel (e.g., F-QPCH). When access terminals are configured to detect F-QPCH, the access terminals wake up prior to (e.g., 100 ms prior to) their assigned F-PCH slot to monitor the paging indicators on F-QPCH. In idle mode handoff, if an access terminal detects a new sector that is stronger than the currently camped sector (e.g., by a defined margin), the access terminal performs idle handoff and monitors the F-PCH on the new cell (e.g., sector). In this case, only one out of every 6 consecutive F-PCH slots may be guaranteed to be covered with a beacon on each frequency. Thus, when an access terminal enters into femto cell coverage, the access terminal may be expected to detect the beacon within the time interval [0, 6*(Slot Cycle Length)] seconds.

The delay in detecting a femto cell by an access terminal may increase if more frequencies are used in the system. In general, when an access terminal is in the coverage of a femto cell and the access terminal is not configured for F-QPCH, the maximum delay in detecting the beacon may be expressed as:

$$\text{Max\_Delay}_{No\ F\text{-}QPCH} = \frac{M+1}{M} \cdot \text{(Number of Frequencies)} \cdot \text{(Slot Cycle Length)} \quad \text{EQUATION 1}$$

where $M = \left\lfloor \frac{BTD\ (ms)}{80\ ms} \right\rfloor$

For the case where an access terminal is configured for F-QPCH, maximum delay may be expressed as:

$$\text{Max\_Delay}_{F\text{-}QPCH} = \frac{K}{L} \cdot \text{(Number of Frequencies)} \cdot \text{(Slot Cycle Length)} \quad \text{EQUATION 2}$$

where $L = \left\lfloor \frac{BTD\ (ms) - 100\ ms}{80\ ms} \right\rfloor$ and $K = \left\lceil \frac{BTD\ (ms)}{80\ ms} \right\rceil$ In some aspects, the maximum delays set forth in Equations 1 and 2 describe delays arising due to the beacon transmit waveform timeline. It is assumed that the beacon is transmitted with adequate power so that an access terminal may detect the beacon. If the beacon power is not adequate, an access terminal may not be able to detect the beacon and the delay may be infinite.

The table of FIG. 11A shows sample maximum delay in detecting a femto cell for femto users in femto cell coverage for different values of BTD and different numbers of carrier frequencies used in the system. The service outage duration (equal to BTD) and period of this outage for macro cell access terminals in the femto cell coverage is also shown. For example, when BTD=200 ms and there are two frequencies, FIG. 11A shows that a macro cell access terminal in "strong" femto cell coverage may experience a service outage of 200 ms every 480 ms. For an access terminal conducting a voice call, this outage may cause noticeable voice artifact on DL voice quality. As BTD increases, both the period and duration of service outages increase. Furthermore, if the service outage on the DL (consecutive frame erasures) exceeds 240 ms, the access terminal may shut down its RL transmission until two good frames are received on the DL, thereby potentially resulting in additional artifact on the RL voice quality.

The table of FIG. 11B displays similar data as FIG. 11A for the case where access terminals are configured for a quick paging channel. In this case, the delay in acquiring a femto cell is further increased.

In accordance with the teachings herein, beacon transmit parameters may be defined to provide an acceptable tradeoff between acquisition delay and interference. For example, BTD may be configured based on the total number of carriers in the system and desired maximum delay for femto cell acquisition. In addition to BTD, another parameter to consider is the transmit power used for beacon channels. Larger transmit power improves beacon coverage for femto cell access terminals but increases the outage range for macro cell access terminals that are not allowed to associate with femto cells (e.g., due to restricted association, discussed in more detail below).

Table 1 shows an example of the fraction of macro cell access terminals experiencing service outage due to femto beacons and the coverage for femto cell access terminals at a user's home for different values of the beacon F-CPICH transmit power (e.g., with reference to femto cell F-PICH transmit power). For example, at 0 dB power offset (e.g., beacon channels transmitted at the same power as the femto cell control channels on the femto cell operating frequency), it is seen that 5.5% of macro cell users in the system may experience service outage while 91.8% of the home may be covered by the beacon. If the beacon transmit power is reduced by 20 dB, the service outage is reduced (1%) and the home coverage is reduced as well (63.9%).

TABLE 1

| | Beacon F-CPICH power offset | | | | |
|---|---|---|---|---|---|
| | 0 dB | −3 dB | −6 dB | −10 dB | −20 dB |
| Fraction of macro cell access terminals in outage | 5.5% | 3.8% | 2.7% | 2.2% | 1.0% |
| Fraction of home access terminals in femto cell coverage | 91.8% | 90.6% | 87.0% | 82.9% | 63.9% |

If beacon power is reduced too much, a femto cell user at home may never acquire the femto cell. For example, a user may have to walk into the room where the femto resides to acquire the femto cell. To solve this problem, beacon transmit power may be increased periodically to provide layered beacon coverage as taught herein.

Two sample designs for adjusting a high and low power schedule for beacon transmission are described below. In some aspects, these designs may involve the generalized operations described in the flowchart of FIG. 12.

As represented by block 1202, an acceptable level of outage for access terminals (e.g., access terminal 102) on the macro channel(s) is determined. As discussed herein, the extent of this outage depends on the power level used by the femto to transmit beacons. Hence, in some aspects, this outage indicates an acceptable level of interference that a macro cell access terminal may tolerate as a result of the transmission of beacons by the femto. In some implementations, this outage information may relate to the percentage of macro cell access terminals that are in outage as described in Table 1.

As represented by block 1204, an acceptable level of coverage for femto beacons is determined (e.g., coverage based on reliable decoding of beacons at a predetermined set of path losses from the access point). In some implementations, this coverage information may relate to the percentage of home access terminals that are in femto cell coverage as described in Table 1.

As represented by block 1206, the power levels and time periods used to transmit beacons are then determined. As discussed in more detail in the designs set forth below, these parameters may be based, at least in some aspects, on the acceptable outage determined at block 1202, the acceptable coverage determined at block 1204, the number of carriers employed, and the length of the slot cycle.

The parameters described above may be defined by a network plan, by operation of the access point 108, by operation of some other entity, or some combination thereof. Hence, in some cases, one or more of these operations or a portion of these operations may be performed by the access point 108 (e.g., the beacon controller 410). In some cases, the determinations of blocks 1202 and 1204 or of block 1206 may simply involve reading parameters that were downloaded into a data memory.

The first sample design involves setting BTD for different power levels based on the Max_Delay parameter discussed above at Equations 1 and 2 through the use of a multi-step process. At Step 1, the beacon transmit power is set to P1 for a period of N1*Max_Delay. At Step 2, the beacon transmit power is set to P2 for a period of N2*Max_Delay. At Step k, the beacon transmit power is set to Pk for a period of Nk*Max_Delay. At step k+1 the process returns to Step 1.

As an example, consider the case with two frequencies and BTD=440 ms and no F-QPCH. As seen from Table 1 for this case, Max_Delay is equal to 12.3 seconds, the service outage duration is 0.44 seconds, and the outage period is 0.96 seconds. Assume the parameters for the above algorithm are chosen (e.g., by network planning) as follows: k=2, P1=−20 dB (offset), N1=10, P2=0 dB (offset), and N2=1.

In this case, a beacon is transmitted at −20 dB power offset for 10*12.3=123 seconds duration. During this time period only 1% of the macro cell access terminals will experience the service outage. However, only 63.9% of home locations will be covered with the beacon (based on Table 1). In this case, if a user comes home, the user's access terminal has a reasonable chance of detecting the femto cell. If the user happens to be stationary in an unlucky location of the house, then after a maximum of 123+12.3=135.3 seconds the user's access terminal is very likely (91.3%) to acquire the femto cell. Note that once the user's access terminal acquires the femto cell, the access terminal may be put on the femto cell carrier frequency (e.g., the femto channel) which is likely to maintain the coverage for the user (since P2 is set to 0 dB power offset, i.e., the same power as the femto cell operating frequency transmit power). In this case, 5.5% of macro cell access terminals will experience coverage outage, but only intermittently (for 12.3 sec in every 135.3 seconds time interval). These parameters may be further optimized based on field measurements either as static parameters or autonomously by the femto. For example, ping effects may be reduced (e.g., minimized) by adjusting the power settings, etc.

The second sample design describes how a schedule may be set up for the case where there are only two power level offsets for the beacon, a high power beacon transmission with offset 0 dB and a lower power beacon transmission with offset −20 dB. There are S paging slots per slot cycle. Hence, the slots are numbered 0,1, . . . ,S-1 (modulo S). There are F macro channels on which beacons are transmitted: f=0,1,..., F-1.

To minimize voice channel interruption and degradation on any frequency channel, the maximum burst length or BTD is restricted to M paging slots (plus some additional overhang) and a high power burst appears no more frequently than N×S paging slots or N slot cycles on any frequency channel. That is, degradation is restricted to less than M+1 slots every N×S slots or N slot cycles.

Successive slot cycles are denoted by k=0,1,2,3, and so on. Thus, a high power burst occurs in a slot cycle k such that k modulo N=0. When in a slot cycle k such that k modulo N=0, the high power beacon hops through the set of F macro frequency channels transmitting on m paging slots on each channel, plus one slot of pre-transmission overhang. This occupies a total of F(M+1) slots. The beacon is then switched to a low power mode for the remainder of that slot cycle as well as the next N−1 slot cycles. During the low power mode, the beacon may switch channels as dictated by the BTD parameter.

Given these restrictions, the following schedule may be proposed for the high power beacon transmission: For Slot cycle 0, let f(m+1), f(m+1)+1, . . . , f(m+1)+m−1 be the slots at which a high power beacon is transmitted on frequency f in slot cycle 0; Then, for slot cycles containing high power beacons, the slot positions may be given as:

Slot cycle $k=jN, j=0, 1, 2, \ldots$ $f(m+1)-k(2m-1),$ $f(m+1)-k(2m-1)+1$

. . . , $f(m+1)-k(2m-1)+m-1$ EQUATION 3

All these are slot numbers are modulo S.

As an alternate description: For slot cycle k=j*N (where j=1,2,3 . . . ), slots f(m+1)−jm, f(m+1)−jm+1, . . . , f(m+1)−jm+(m−1) have a high power beacon.

Figure 13:
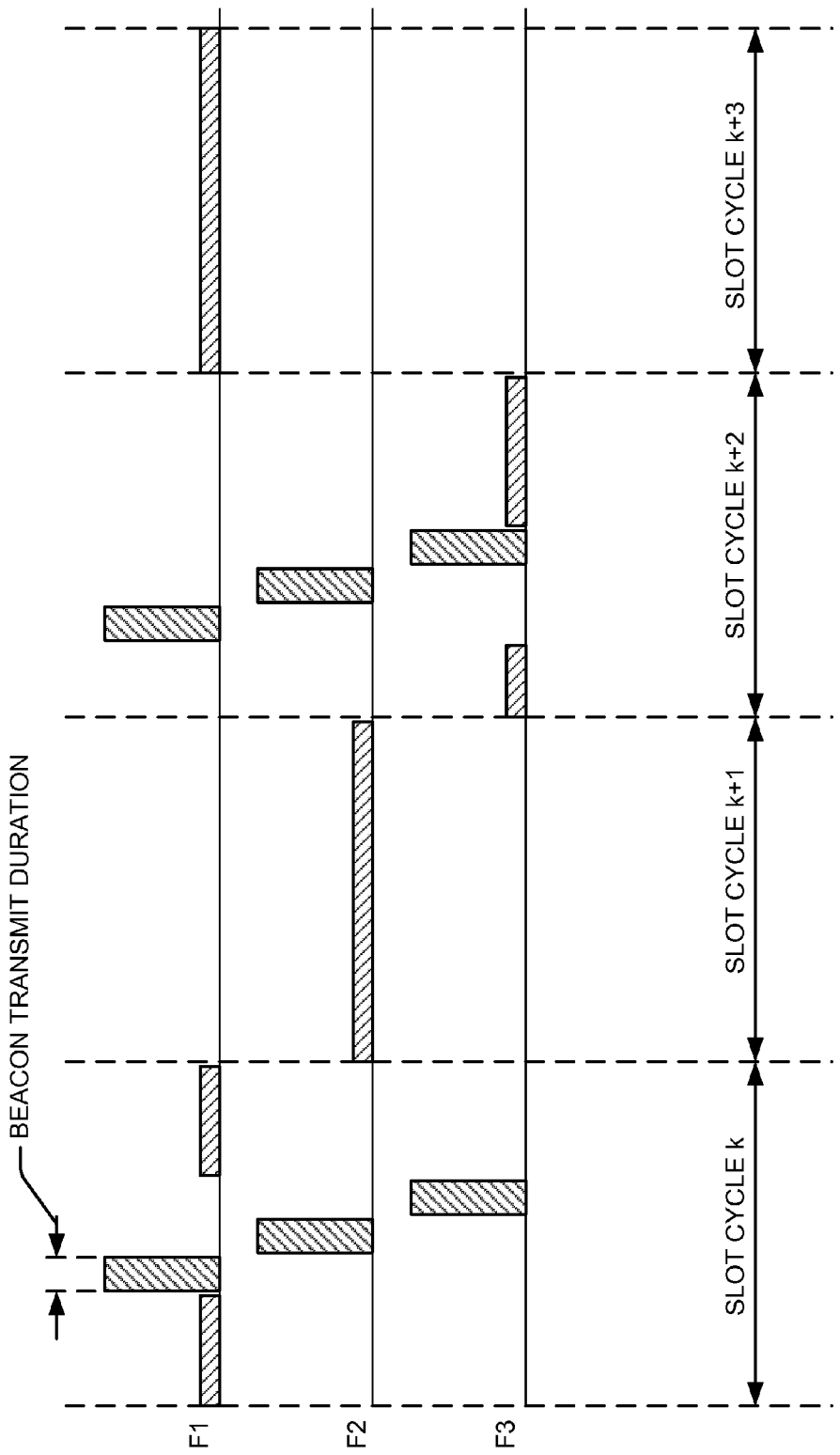
FIG. 13 is a simplified diagram of sample beacon transmissions based on layered coverage.

FIG. 13 illustrates a sample schedule for interspersing high and low power beacons in accordance with the teachings herein. Here the BTD of the high power bursts may be m slots. All paging slots are covered, while limiting the interruption to no more than m+1 paging slots out of every NS slots. FIG. 13 also illustrates how the beacon transmit time periods may be different in different cycles.

Also, as mentioned above, under certain circumstances (e.g., no active or idle users), layered beacon hopping may be employed on the femto channel. Accordingly, the beacon transmission on carrier F3 as shown in FIG. 13 may correspond to the femto channel under these circumstances.

Figure 14:
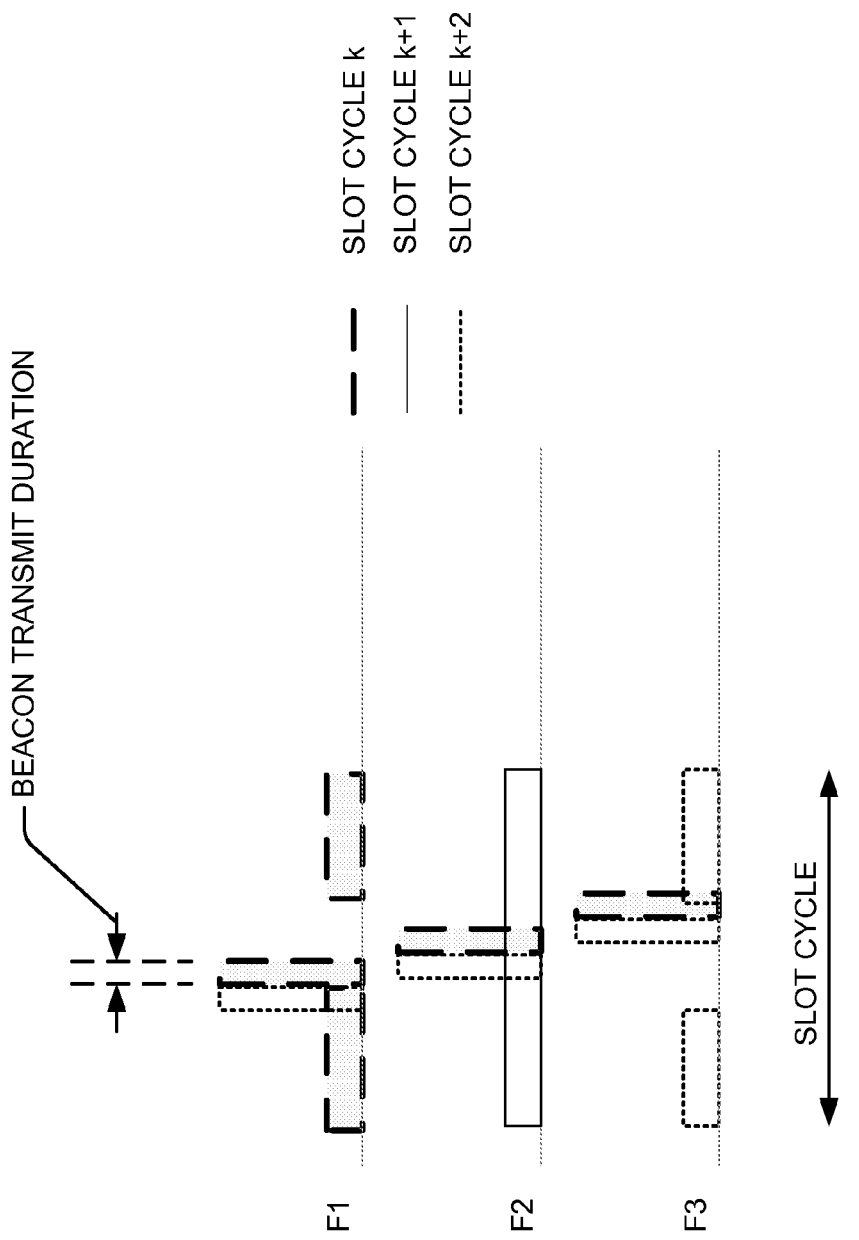
FIG. 14 is a simplified diagram illustrating sample beacon slot coverage in successive slot cycles.

The above thus describes one possible schedule that provides high power beacon transmissions over N×S/m slot cycles to cover the entire paging slot space of S slots. One benefit of this scheme is that it may cover the pre-transmission overhang of one high power beacon transmission with a full paging slot in the very next transmission. This is shown in FIG. 14. Here it may be seen that the high power burst of slot cycle k+2 (e.g., with a BTD of m slots) occurs in slots that precede the slots of the previous high power burst (slot cycle k).

A schedule as taught herein may be extended to the case where each high power slot needs to be repeated twice in succession. This may be the case if the access terminal procedures are such that the access terminal waits for one additional slot cycle after observing a new PN sequence before decoding the broadcast/paging channel. However, this case would double the total wait time, as shown by the tables referenced above.

Other schedules may be designed that tradeoff between the frequency with which the high power beacon occurs and the BTD in accordance with the teachings herein. The above design chooses to transmit one beacon burst on each frequency once every N slot cycles. Simple extensions of this include for, example, transmitting two high power beacon bursts separated by a certain number of slots on each frequency in slot cycle k, and repeating every 2N slot cycles. To limit each high power beacon transmission to BTD, the described design involves rotating through the F frequency channels. More generally, L high power beacon bursts may be transmitted in succession and repeated every LN slot cycles.

As discussed above, the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

Figure 15:
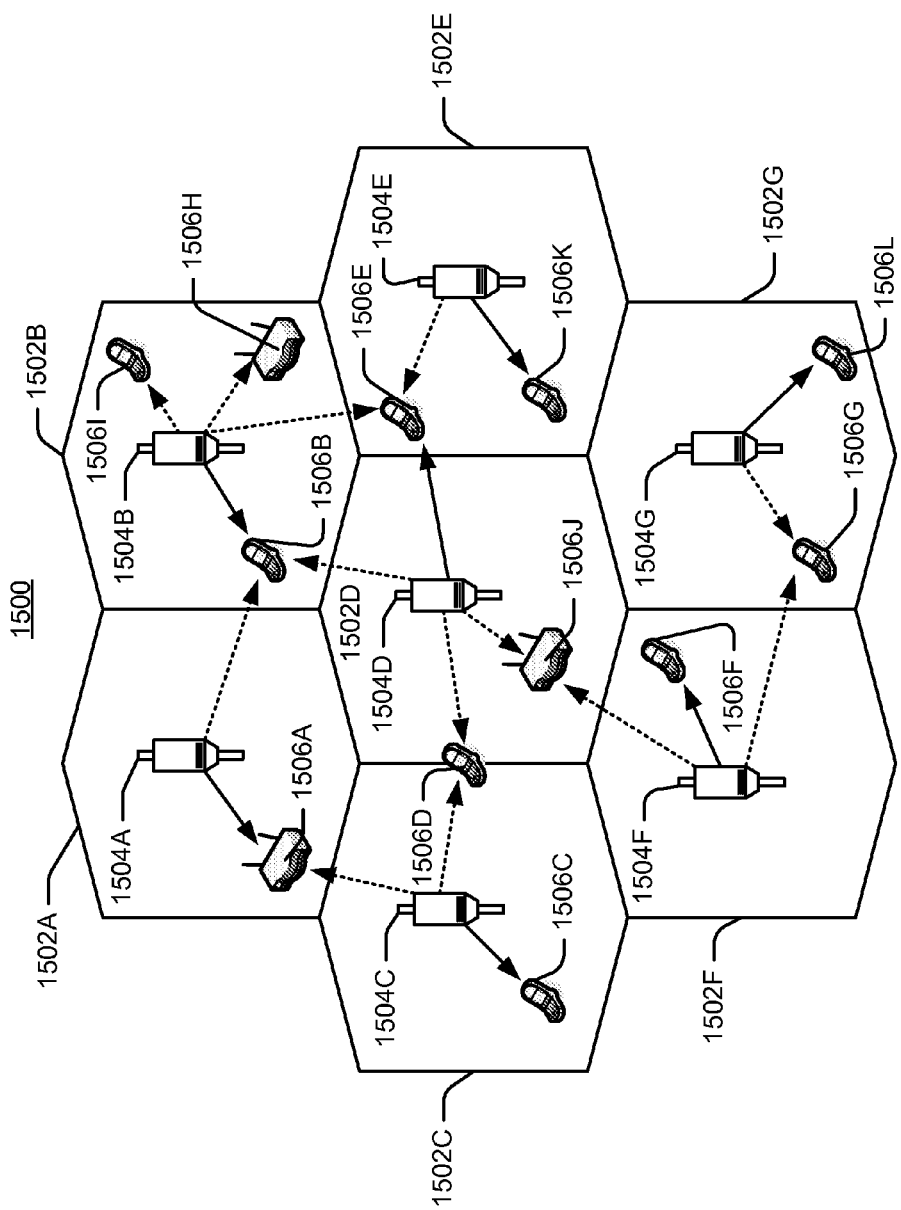
FIG. 15 is a simplified diagram of a wireless communication system.

FIG. 15 illustrates a wireless communication system 1500, configured to support a number of users, in which the teachings herein may be implemented. The system 1500 provides communication for multiple cells 1502, such as, for example, macro cells 1502A-1502G, with each cell being serviced by a corresponding access point 1504 (e.g., access points 1504A-1504G). As shown in FIG. 15, access terminals 1506 (e.g., access terminals 1506A-1506L) may be dispersed at various locations throughout the system over time. Each access terminal 1506 may communicate with one or more access points 1504 on a forward link (FL) and/or a reverse link (RL) at a given moment, depending upon whether the access terminal 1506 is active and whether it is in soft handoff, for example. The wireless communication system 1500 may provide service over a large geographic region. For example, macro cells 1502A-1502G may cover a few blocks in a neighborhood or several miles in rural environment.

Figure 16:
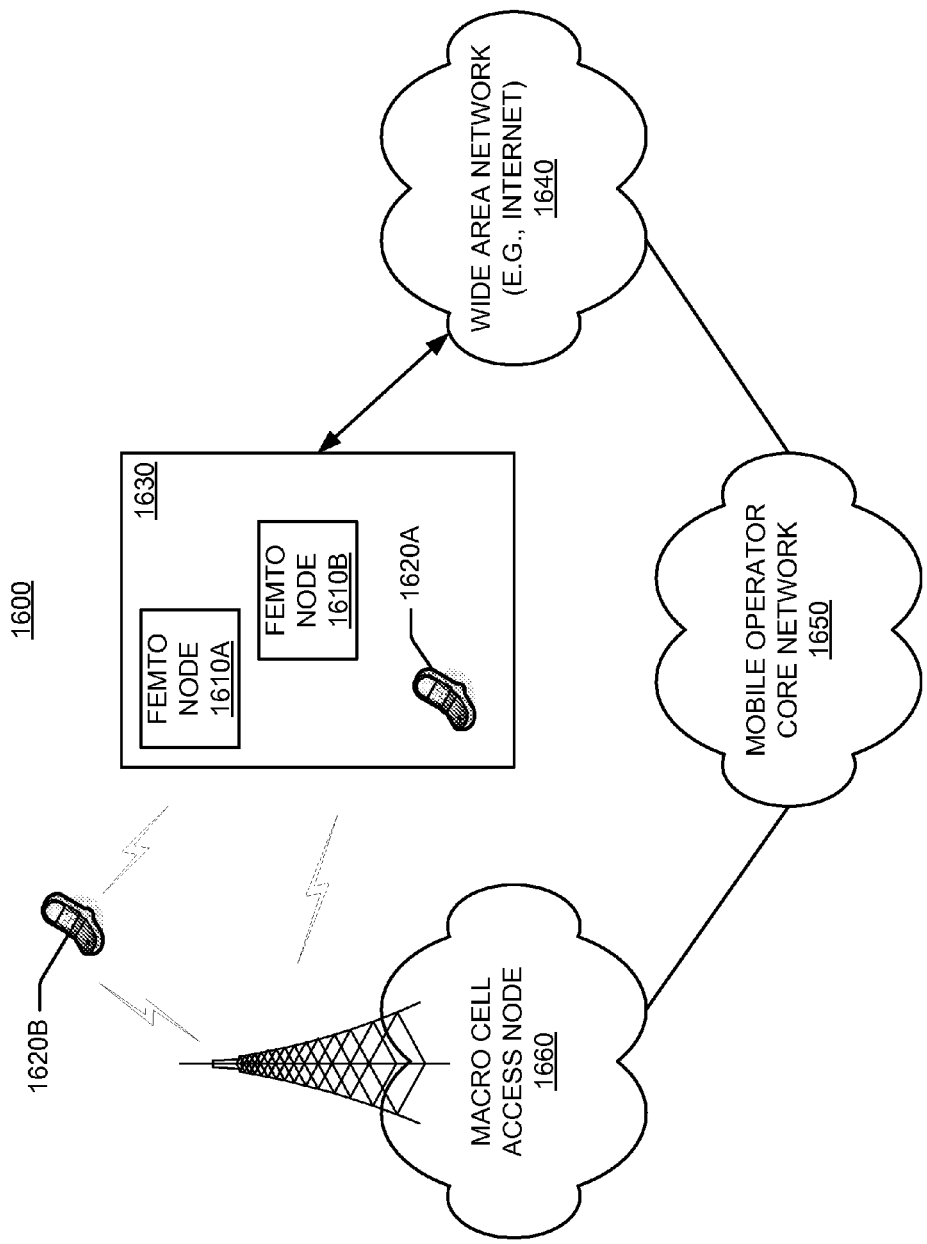
FIG. 16 is a simplified diagram of a wireless communication system including femto nodes.

FIG. 16 illustrates an exemplary communication system 1600 where one or more femto nodes are deployed within a network environment. Specifically, the system 1600 includes multiple femto nodes 1610 (e.g., femto nodes 1610A and 1610B) installed in a relatively small scale network environment (e.g., in one or more user residences 1630). Each femto node 1610 may be coupled to a wide area network 1640 (e.g., the Internet) and a mobile operator core network 1650 via a DSL router, a cable modem, a wireless link, or other connectivity means (not shown). As will be discussed below, each femto node 1610 may be configured to serve associated access terminals 1620 (e.g., access terminal 1620A) and, optionally, other (e.g., hybrid or alien) access terminals 1620 (e.g., access terminal 1620B). In other words, access to femto nodes 1610 may be restricted whereby a given access terminal 1620 may be served by a set of designated (e.g., home) femto node(s) 1610 but may not be served by any non-designated femto nodes 1610 (e.g., a neighbor's femto node 1610).

Figure 17:
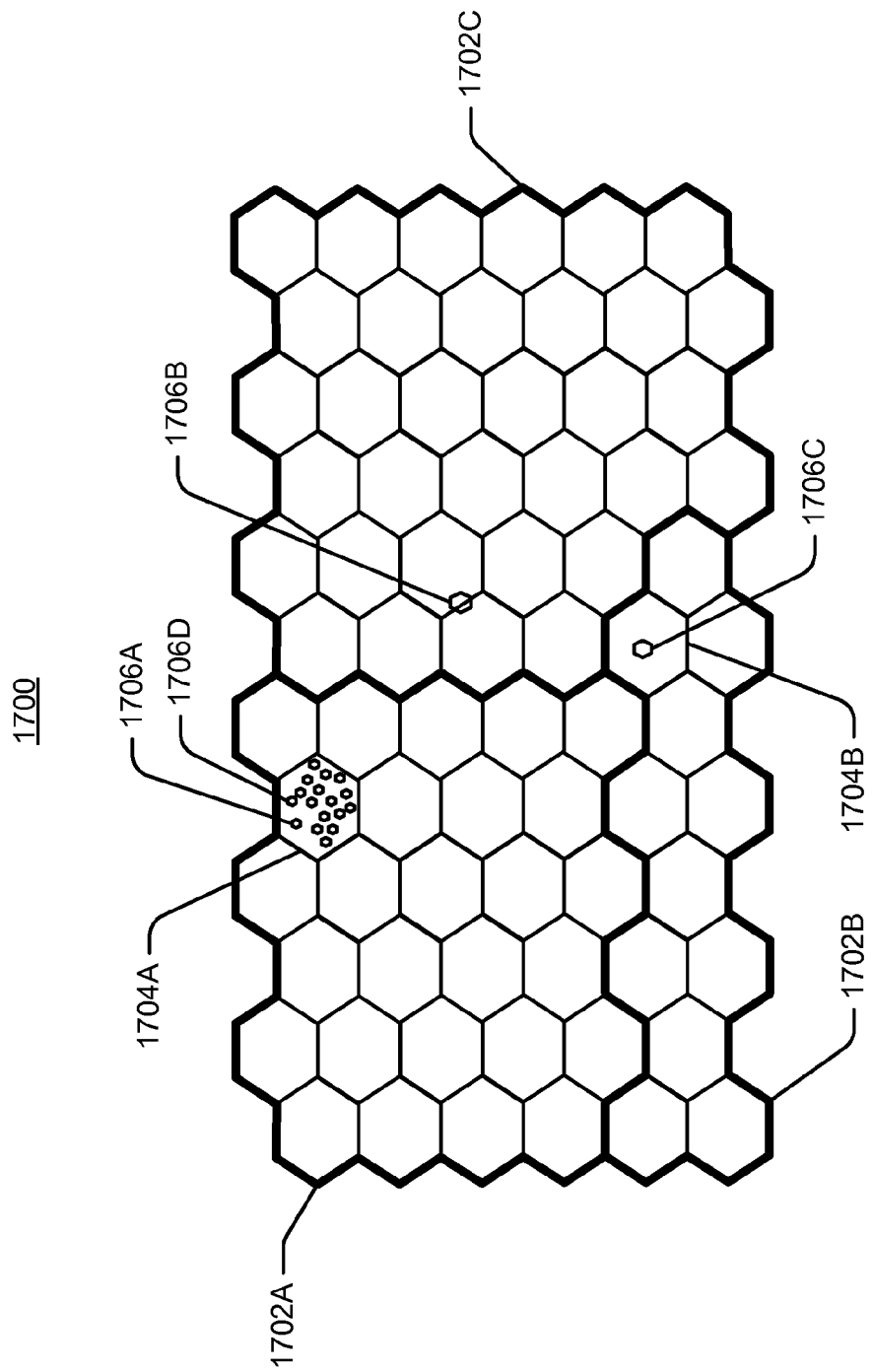
FIG. 17 is a simplified diagram illustrating coverage areas for wireless communication.

FIG. 17 illustrates an example of a coverage map 1700 where several tracking areas 1702 (or routing areas or location areas) are defined, each of which includes several macro coverage areas 1704. Here, areas of coverage associated with tracking areas 1702A, 1702B, and 1702C are delineated by the wide lines and the macro coverage areas 1704 are represented by the larger hexagons. The tracking areas 1702 also include femto coverage areas 1706. In this example, each of the femto coverage areas 1706 (e.g., femto coverage areas 1706B and 1706C) is depicted within one or more macro coverage areas 1704 (e.g., macro coverage areas 1704A and 1704B). It should be appreciated, however, that some or all of a femto coverage area 1706 may not lie within a macro coverage area 1704. In practice, a large number of femto coverage areas 1706 (e.g., femto coverage areas 1706A and 1706D) may be defined within a given tracking area 1702 or macro coverage area 1704. Also, one or more pico coverage areas (not shown) may be defined within a given tracking area 1702 or macro coverage area 1704.

Referring again to FIG. 16, the owner of a femto node 1610 may subscribe to mobile service, such as, for example, 3G mobile service, offered through the mobile operator core network 1650. In addition, an access terminal 1620 may be capable of operating both in macro environments and in smaller scale (e.g., residential) network environments. In other words, depending on the current location of the access terminal 1620, the access terminal 1620 may be served by a macro cell access point 1660 associated with the mobile operator core network 1650 or by any one of a set of femto nodes 1610 (e.g., the femto nodes 1610A and 1610B that reside within a corresponding user residence 1630). For example, when a subscriber is outside his home, he is served by a standard macro access point (e.g., access point 1660) and when the subscriber is at home, he is served by a femto node (e.g., node 1610A). Here, a femto node 1610 may be backward compatible with legacy access terminals 1620.

A femto node 1610 may be deployed on a single frequency or, in the alternative, on multiple frequencies. Depending on the particular configuration, the single frequency or one or more of the multiple frequencies may overlap with one or more frequencies used by a macro access point (e.g., access point 1660).

In some aspects, an access terminal 1620 may be configured to connect to a preferred femto node (e.g., the home femto node of the access terminal 1620) whenever such connectivity is possible. For example, whenever the access terminal 1620A is within the user's residence 1630, it may be desired that the access terminal 1620A communicate only with the home femto node 1610A or 1610B.

In some aspects, if the access terminal 1620 operates within the macro cellular network 1650 but is not residing on its most preferred network (e.g., as defined in a preferred roaming list), the access terminal 1620 may continue to search for the most preferred network (e.g., the preferred femto node 1610) using a Better System Reselection (BSR), which may involve a periodic scanning of available systems to determine whether better systems are currently available, and subsequent efforts to associate with such preferred systems. With the acquisition entry, the access terminal 1620 may limit the search for specific band and channel. For example, one or more femto channels may be defined whereby all femto nodes (or all restricted femto nodes) in a region operate on the femto channel(s). The search for the most preferred system may be repeated periodically. Upon discovery of a preferred femto node 1610, the access terminal 1620 selects the femto node 1610 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1610 that reside within the corresponding user residence 1630). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto nodes) that share a common access control list of access terminals.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node or some other type of node may provide the same or similar functionality for a different (e.g., larger) coverage area. For example, a pico node may be restricted, a home pico node may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 18:
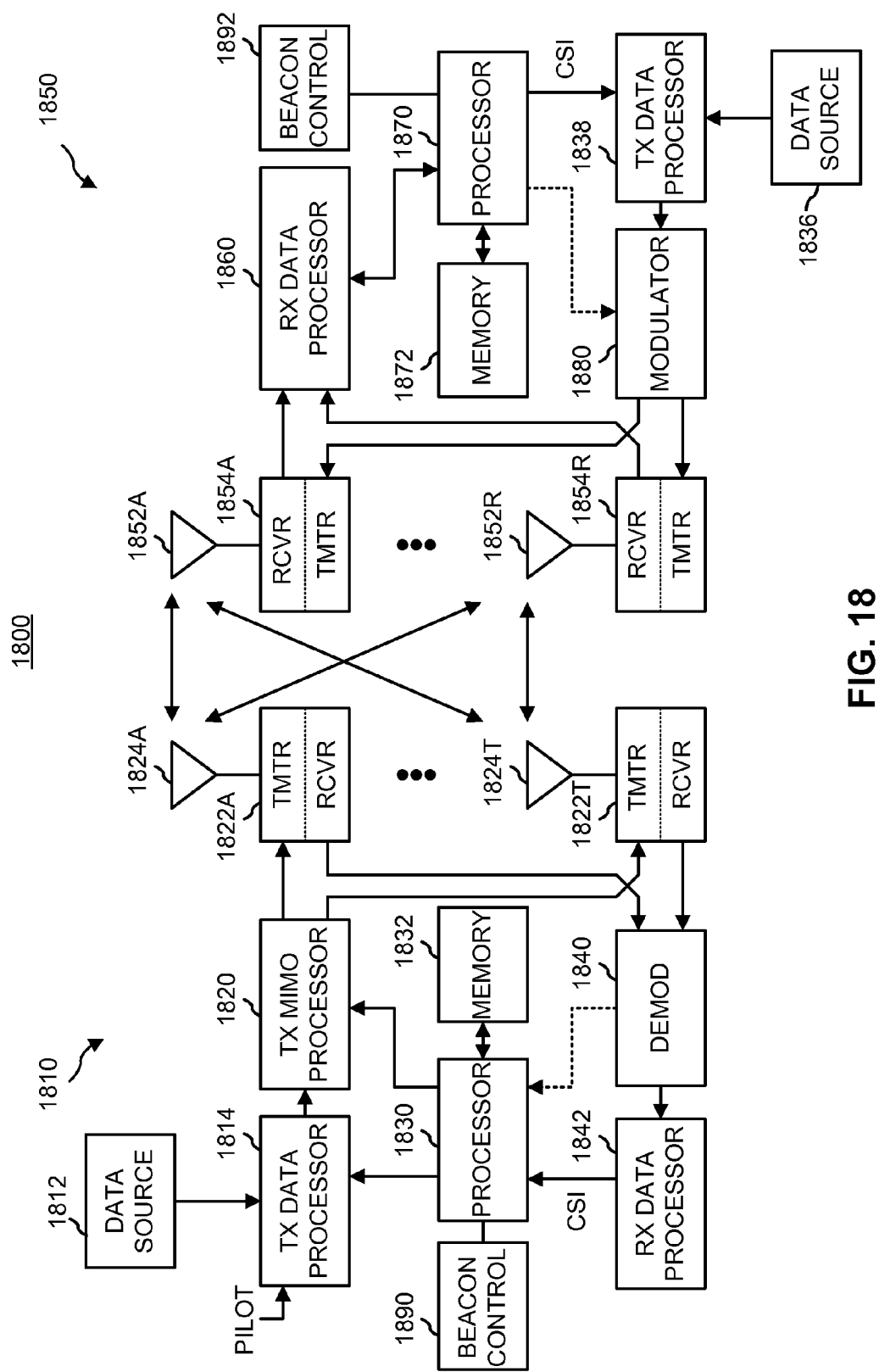
FIG. 18 is a simplified block diagram of several sample aspects of communication components.

FIG. 18 illustrates a wireless device 1810 (e.g., an access point) and a wireless device 1850 (e.g., an access terminal) of a sample MIMO system 1800. At the device 1810, traffic data for a number of data streams is provided from a data source 1812 to a transmit (TX) data processor 1814. Each data stream may then be transmitted over a respective transmit antenna.

The TX data processor 1814 formats, codes, and interleaves the traffic data for each data stream based on a particular coding scheme selected for that data stream to provide coded data. The coded data for each data stream may be multiplexed with pilot data using OFDM or other suitable techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1830. A data memory 1832 may store program code, data, and other information used by the processor 1830 or other components of the device 1810.

The modulation symbols for all data streams are then provided to a TX MIMO processor 1820, which may further process the modulation symbols (e.g., for OFDM). The TX MIMO processor 1820 then provides $N_T$ modulation symbol streams to $N_T$ transceivers (XCVR) 1822A through 1822T. In some aspects, the TX MIMO processor 1820 applies beamforming weights to the symbols of the data streams and to the antenna from which the symbol is being transmitted.

Each transceiver 1822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1822A through 1822T are then transmitted from $N_T$ antennas 1824A through 1824T, respectively.

At the device 1850, the transmitted modulated signals are received by $N_R$ antennas 1852A through 1852R and the received signal from each antenna 1852 is provided to a respective transceiver (XCVR) 1854A through 1854R. Each transceiver 1854 conditions (e.g., filters, amplifies, and downconverts) a respective received signal, digitizes the conditioned signal to provide samples, and further processes the samples to provide a corresponding "received" symbol stream.

A receive (RX) data processor 1860 then receives and processes the $N_R$ received symbol streams from $N_R$ transceivers 1854 based on a particular receiver processing technique to provide $N_T$ "detected" symbol streams. The RX data processor 1860 then demodulates, deinterleaves, and decodes each detected symbol stream to recover the traffic data for the data stream. The processing by the RX data processor 1860 is complementary to that performed by the TX MIMO processor 1820 and the TX data processor 1814 at the device 1810.

A processor 1870 periodically determines which pre-coding matrix to use (discussed below). The processor 1870 formulates a reverse link message comprising a matrix index portion and a rank value portion. A data memory 1872 may store program code, data, and other information used by the processor 1870 or other components of the device 1850.

The reverse link message may comprise various types of information regarding the communication link and/or the received data stream. The reverse link message is then processed by a TX data processor 1838, which also receives traffic data for a number of data streams from a data source 1836, modulated by a modulator 1880, conditioned by the transceivers 1854A through 1854R, and transmitted back to the device 1810.

At the device 1810, the modulated signals from the device 1850 are received by the antennas 1824, conditioned by the transceivers 1822, demodulated by a demodulator (DEMOD) 1840, and processed by a RX data processor 1842 to extract the reverse link message transmitted by the device 1850. The processor 1830 then determines which pre-coding matrix to use for determining the beam-forming weights then processes the extracted message.

FIG. 18 also illustrates that the communication components may include one or more components that perform beacon-related operations as taught herein. For example, a beacon control component 1890 may cooperate with the processor 1830 and/or other components of the device 1810 to send beacon signals to another device (e.g., device 1850) and to receive beacon signals from another device (e.g., another access point) as taught herein. Similarly, a beacon control component 1892 may cooperate with the processor 1870 and/or other components of the device 1850 to receive beacon signals from another device (e.g., device 1810). It should be appreciated that for each device 1810 and 1850 the functionality of two or more of the described components may be provided by a single component. For example, a single processing component may provide the functionality of the beacon control component 1890 and the processor 1830 and a single processing component may provide the functionality of the beacon control component 1892 and the processor 1870.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 19:
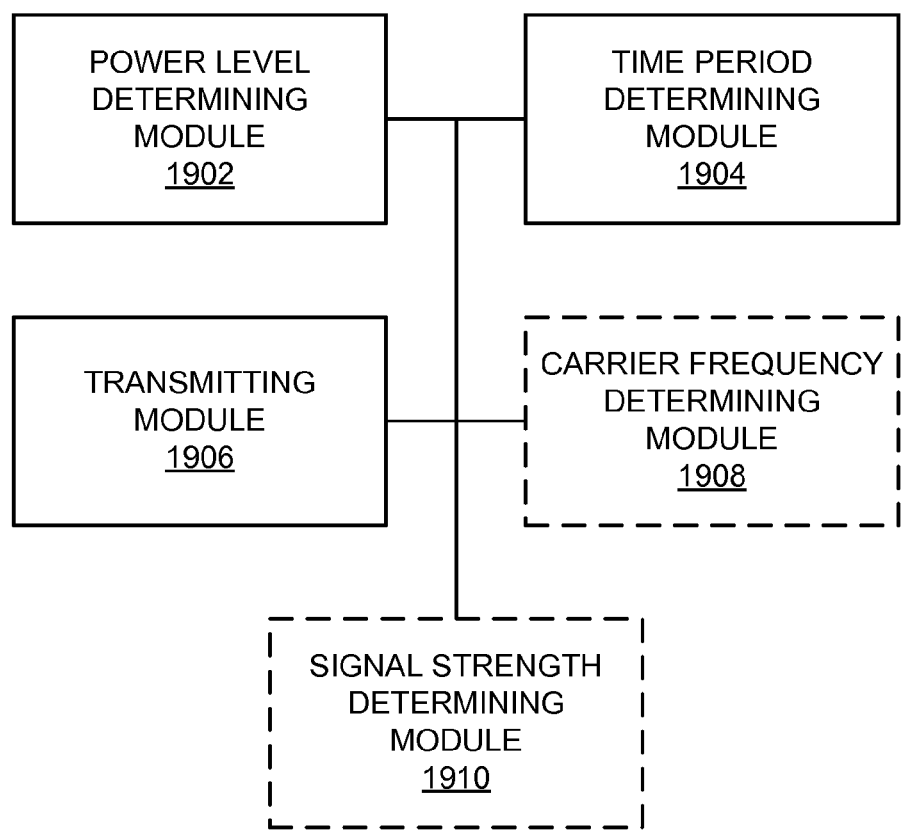
FIG. 19 is a simplified block diagram of several sample aspects of an apparatus configured to provide beacons as taught herein.

The functionality described herein (e.g., with regard to one or more of the accompanying figures) may correspond in some aspects to similarly designated "means for" functionality in the appended claims. Referring to FIG. 19, apparatus 1900 is represented as a series of interrelated functional modules. Here, a power level determining module 1902 may correspond at least in some aspects to, for example, a beacon controller as discussed herein. A time period determining module 1904 may correspond at least in some aspects to, for example, a beacon controller as discussed herein. A transmitting module 1906 may correspond at least in some aspects to, for example, a transmitter as discussed herein. A carrier frequency determining module 1908 may correspond at least in some aspects to, for example, a beacon controller as discussed herein. A signal strength determining module 1910 may correspond at least in some aspects to, for example, a monitor as discussed herein.

The functionality of the modules of FIG. 19 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 19 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of generating communication beacons, comprising:
    determining a set of different carrier frequencies for transmitting communication beacon signals from an access point, wherein the set of different carrier frequencies include carrier frequencies for a femto channel associated with the access point and at least one other channel;
    determining different levels of signal strength associated with other access points on the set of different carrier frequencies;
    determining a set of different power levels for transmitting the communication beacon signals from the access point on the different carrier frequencies based on the different levels of the determined signal strength;
    determining a set of different time period durations for transmitting the communication beacon signals;
    matching the different power levels with the different time period durations to achieve respective duty cycles defined for a plurality of corresponding coverage areas;
    transmitting the communication beacon signals in a frequency hopping manner, on the different carrier frequencies, at the different power levels during the different time period durations based on the respective duty cycles, wherein distinct power levels among the different power levels are assigned to at least two of the different carrier frequencies;
    determining whether there are any calls that are active on the access point; and
    switching to transmitting the communication beacon signals in a non-frequency hopping manner in response to determining that one or more calls are active on the access point.

2. The method of claim 1, wherein different time period durations of the set of different time period durations are assigned to different carrier frequencies of the set of different carrier frequencies.

3. The method of claim 1, wherein the determination of the different power levels and the different time period durations comprises defining the different power levels and the different time period durations based on at least one determined acceptable level of interference on a macro access point carrier frequency and at least one determined acceptable coverage area for transmissions by the access point.

4. The method of claim 1, wherein the determination of the different power levels comprises defining the different power levels based on reliable decoding of beacons at a predetermined set of path losses from the access point.

5. The method of claim 1, wherein:
    a first one of the power levels is defined to be greater than a second one of the power levels; and
    a first one of the different time period durations associated with the first one of the power levels is defined to be shorter than a second one of the different time period durations associated with the second one of the power levels.

6. The method of claim 1, wherein the access point comprises a femto access point.

7. The method of claim 1, further comprising scheduling the transmission of the communication beacon signals synchronized to at least one known wake-up time of at least one access terminal.

8. The method of claim 1, further comprising:
    determining communication transmission times and carrier frequencies of one of the other access points; and scheduling the transmission of the communication beacon signals to mitigate conflict with the determined communication transmission times and the carrier frequencies.

9. The method of claim 1, further comprising randomly scheduling the transmission of the communication beacon signals at different times on the different frequencies to mitigate interference with transmissions of one of the other access points.

10. The method of claim 1, wherein the communication beacon signals comprise at least one common overhead channel.

11. The method of claim 1, wherein the communication beacon signals comprise at least one of a group consisting of: pilot channel, paging channel, broadcast channel, and synchronization channel.

12. An apparatus for generating communication beacons, comprising:
a beacon controller configured to determine a set of different carrier frequencies for transmitting communication beacon signals from an access point, wherein the set of different carrier frequencies include carrier frequencies for a femto channel associated with the access point and at least one other channel, to determine different levels of signal strength associated with other access points on the different carrier frequencies, to determine a set of different power levels for transmitting the communication beacon signals from the access point on the different carrier frequencies based on the different levels of the determined signal strength, to determine a set of different time period durations for transmitting the communication beacon signals, and to match the different power levels with the different time period durations to achieve respective duty cycles defined for a plurality of corresponding coverage areas; and
a transmitter configured to transmit the communication beacon signals in a frequency hopping manner, on the different carrier frequencies, at the different power levels during the different time period durations based on the respective duty cycles, wherein distinct power levels among the different power levels are assigned to at least two of the different carrier frequencies, wherein:
the beacon controller is further configured to determine whether there are any calls that are active on the access point, and
the transmitter is further configured to switch to transmitting the communication beacon signals in a non-frequency hopping manner in response to determining that one or more calls are active on the access point.

13. The apparatus of claim 12, wherein different time period durations of the set of different time period durations are assigned to different carrier frequencies of the set of different carrier frequencies.

14. The apparatus of claim 12, wherein the determination of the different power levels and the different time period durations comprises defining the different power levels and the different time period durations based on at least one determined acceptable level of interference on a macro access point carrier frequency and at least one determined acceptable coverage area for transmissions by the access point.

15. The apparatus of claim 12, wherein the determination of the different power levels comprises defining the different power levels based on reliable decoding of beacons at a predetermined set of path losses from the access point.

16. The apparatus of claim 12, wherein the communication beacon signals comprise at least one common overhead channel.

17. The apparatus of claim 12, wherein the communication beacon signals comprise at least one of a group consisting of: pilot channel, paging channel, broadcast channel, and synchronization channel.

18. An apparatus for generating communication beacons, comprising:
means for determining a set of different carrier frequencies for transmitting communication beacon signals from an access point, wherein the set of different carrier frequencies include carrier frequencies for a femto channel associated with the access point and at least one other channel;
means for determining different levels of signal strength associated with other access points on the different carrier frequencies;
means for determining a set of different power levels for transmitting the communication beacon signals from the access point on the different carrier frequencies based on the different levels of the determined signal strength;
means for determining a set of different time period durations for transmitting the communication beacon signals;
means for matching the different power levels with the different time period durations to achieve respective duty cycles defined for a plurality of corresponding coverage areas;
means for transmitting the communication beacon signals in a frequency hopping manner, on the different carrier frequencies, at the different power levels during the different time period durations based on the respective duty cycles, wherein distinct power levels among the different power levels are assigned to at least two of the different carrier frequencies;
means for determining whether there are any calls that are active on the access point; and
means for switching to transmitting the communication beacon signals in a non-frequency hopping manner in response to determining that one or more calls are active on the access point.

19. The apparatus of claim 18, wherein different time period durations of the set of different time period durations are assigned to different carrier frequencies of the set of different carrier frequencies.

20. The apparatus of claim 18, wherein the determination of the different power levels and the different time period durations comprises defining the different power levels and the different time period durations based on at least one determined acceptable level of interference on a macro access point carrier frequency and at least one determined acceptable coverage area for transmissions by the access point.

21. The apparatus of claim 18, wherein the determination of the different power levels comprises defining the different power levels based on reliable decoding of beacons at a predetermined set of path losses from the access point.

22. The apparatus of claim 18, wherein the communication beacon signals comprise at least one common overhead channel.

23. The apparatus of claim 18, wherein the communication beacon signals comprise at least one of a group consisting of: pilot channel, paging channel, broadcast channel, and synchronization channel.

24. A non-transitory computer-readable medium comprising code for causing a computer to:
determine a set of different carrier frequencies for transmitting communication beacon signals from an access point, wherein the set of different carrier frequencies include carrier frequencies for a femto channel associated with the access point and at least one other channel;

determine different levels of signal strength associated with other access points on the set of different carrier frequencies;

determine a set of different power levels for transmitting the communication beacon signals from the access point on the different carrier frequencies based on the different levels of the determined signal strength;

determine a set of different time period durations for transmitting the communication beacon signals;

match the different power levels with the different time period durations to achieve respective duty cycles defined for a plurality of corresponding coverage areas;

transmit the communication beacon signals in a frequency hopping manner, on the different carrier frequencies, at the different power levels during the different time period durations based on the respective duty cycles, wherein distinct power levels among the different power levels are assigned to at least two of the different carrier frequencies;

determine whether there are any calls that are active on the access point; and switch to transmit the communication beacon signals in a non-frequency hopping manner in response to determining that one or more calls are active on the access point.

25. The non-transitory computer-readable medium of claim 24, wherein different time period durations of the set of different time period durations are assigned to different carrier frequencies of the set of different carrier frequencies.

26. The non-transitory computer-readable medium of claim 24, wherein the determination of the different power levels and the different time period durations comprises defining the different power levels and the different time period durations based on at least one determined acceptable level of interference on a macro access point carrier frequency and at least one determined acceptable coverage area for transmissions by the access point.

27. The non-transitory computer-readable medium of claim 24, wherein the determination of the different power levels comprises defining the different power levels based on reliable decoding of beacons at a predetermined set of path losses from the access point.

28. The non-transitory computer-readable medium of claim 24, wherein the communication beacon signals comprise at least one common overhead channel.

29. The non-transitory computer-readable medium of claim 24, wherein the communication beacon signals comprise at least one of a group consisting of: pilot channel, paging channel, broadcast channel, and synchronization channel.

30. A method of generating communication beacons, comprising:

determining a set of different power levels for transmitting communication beacon signals from an access point;

determining a set of different time period durations for transmitting the communication beacon signals;

matching the different power levels with the different time period durations to achieve respective duty cycles defined for a plurality of corresponding coverage areas;

determining whether there are any calls that are active on the access point;

transmitting the communication beacon signals in a non-frequency hopping manner in response to determining that one or more calls are active on the access point; and transmitting the communication beacon signals in a frequency hopping manner, in response to determining that no calls are active on the access point, on a femto channel associated with the access point and on at least one other channel, at the different power levels during the different time periods based on the respective duty cycles.

* * * * *